(12) United States Patent
Ito et al.

(10) Patent No.: US 7,921,401 B2
(45) Date of Patent: Apr. 5, 2011

(54) STRESS ANALYSIS METHOD, WIRING STRUCTURE DESIGN METHOD, PROGRAM, AND SEMICONDUCTOR DEVICE PRODUCTION METHOD

(75) Inventors: Sachiyo Ito, Kanagawa (JP); Masahiko Hasunuma, Kanagawa (JP); Hisashi Kaneko, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 830 days.

(21) Appl. No.: 11/703,218

(22) Filed: Feb. 7, 2007

(65) Prior Publication Data

US 2007/0204243 A1    Aug. 30, 2007

(30) Foreign Application Priority Data

Feb. 8, 2006  (JP) ................................. 2006-031694

(51) Int. Cl.
*G06F 17/50* (2006.01)
*G06F 11/22* (2006.01)
(52) U.S. Cl. ....................................................... 716/136
(58) Field of Classification Search .................. 716/4, 7, 716/10
See application file for complete search history.

(56) References Cited

U.S. PATENT DOCUMENTS

| | | | | |
|---|---|---|---|---|
| 5,579,249 A * | 11/1996 | Edwards | ............................. | 703/2 |
| 5,610,833 A * | 3/1997 | Chang et al. | ..................... | 716/11 |
| 5,768,156 A * | 6/1998 | Tautges et al. | ................... | 716/20 |
| 6,282,692 B1 * | 8/2001 | Rubin | ................................ | 716/4 |
| 6,304,794 B1 * | 10/2001 | Nishimine et al. | ............ | 700/197 |
| 6,594,800 B2 * | 7/2003 | Chang et al. | ....................... | 716/1 |
| 6,813,749 B2 * | 11/2004 | Rassaian | ............................ | 716/4 |
| 6,958,542 B2 | 10/2005 | Hasunuma et al. | | |
| 7,194,711 B2 * | 3/2007 | Chandra | ............................. | 716/4 |
| 7,505,884 B2 * | 3/2009 | Dadkhah et al. | ................... | 703/2 |
| 7,558,639 B2 * | 7/2009 | Rassaian et al. | ................ | 700/98 |
| 7,587,691 B2 * | 9/2009 | Sutjahjo et al. | .................... | 716/4 |
| 2003/0055612 A1 | 3/2003 | Amakai et al. | | |
| 2003/0154451 A1 * | 8/2003 | Rassaian | ............................ | 716/4 |
| 2004/0044511 A1 * | 3/2004 | Sekido et al. | ................... | 703/14 |
| 2005/0066301 A1 * | 3/2005 | Lorenz et al. | .................... | 716/20 |
| 2005/0167842 A1 | 8/2005 | Nakamura et al. | | |
| 2006/0036984 A1 | 2/2006 | Mukaihira | | |
| 2007/0007618 A1 | 1/2007 | Hasunuma et al. | | |
| 2008/0168413 A1 * | 7/2008 | Kakino et al. | ..................... | 716/9 |
| 2010/0023899 A1 * | 1/2010 | Moroz et al. | ...................... | 716/4 |

FOREIGN PATENT DOCUMENTS

JP    2003-167929    6/2003

OTHER PUBLICATIONS

Zampino, Marc A., "Vibration Analysis of an Electronic Enclosure using Finite Element Analysis", 1995. IEEE, pp. 328-333.*

* cited by examiner

*Primary Examiner* — Stacy A Whitmore
(74) *Attorney, Agent, or Firm* — Finnegan, Henderson, Farabow, Garrett & Dunner, L.L.P.

(57) ABSTRACT

A stress analysis method is provided: including dividing, by using a division unit, an inside of a chip into a plurality of analysis areas, deriving, by using a composite property derivation unit, a composite property into which physical property values of a plurality of materials included in an analysis area are compounded, about each of the plurality of analysis areas on the basis of wiring structure data for each of the plurality of analysis areas, and creating, by using a stress analysis unit, a three-dimensional model of a finite element method which uses each analysis area as an element, to apply the composite property to each element, and to perform a stress analysis.

16 Claims, 14 Drawing Sheets

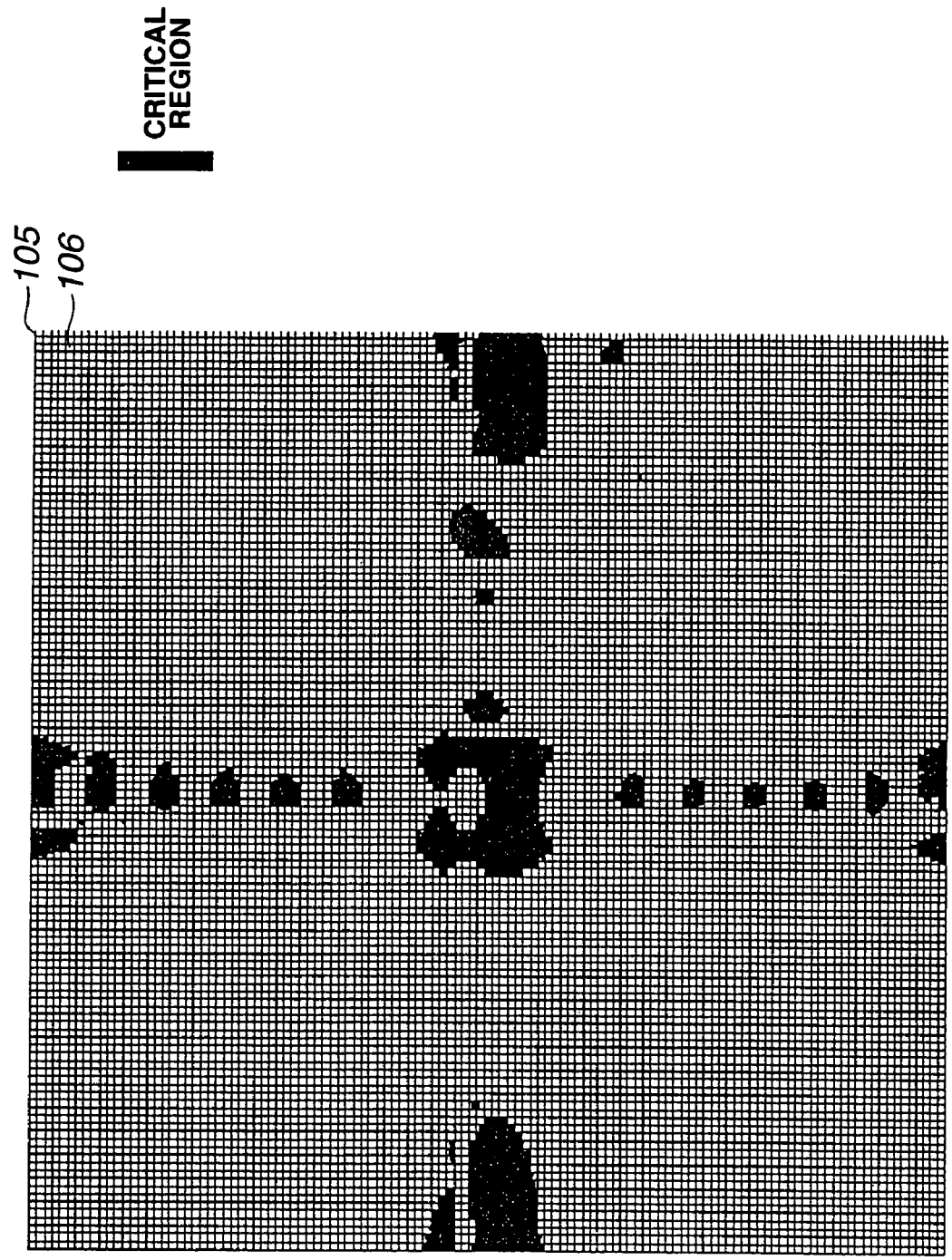

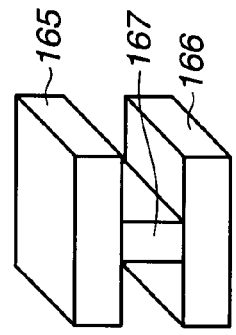
FIG.14C
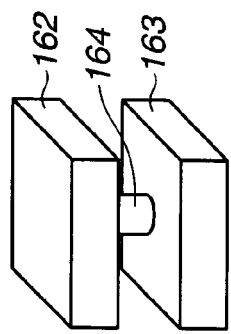
FIG.14B
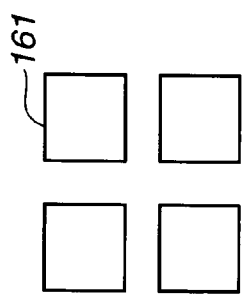
FIG.14A
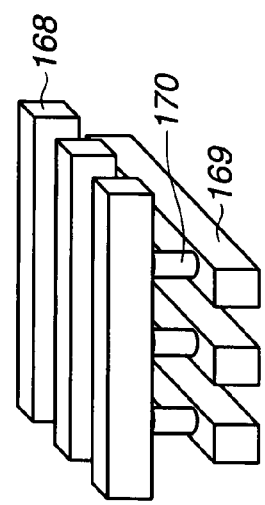
FIG.14E
FIG.14D
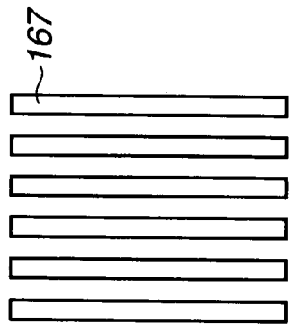
FIG.14F
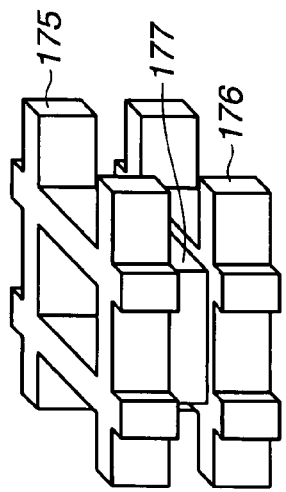
FIG.14H
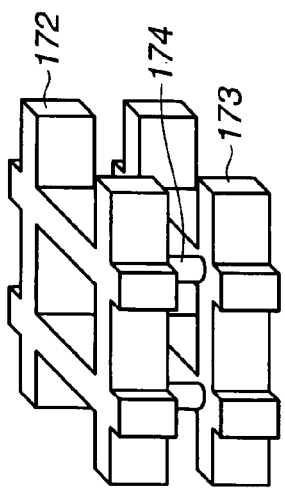
FIG.14G

STRESS ANALYSIS METHOD, WIRING STRUCTURE DESIGN METHOD, PROGRAM, AND SEMICONDUCTOR DEVICE PRODUCTION METHOD

This application is based upon and claims the benefit of priority from the prior Japanese Patent Applications No. 2006-31694, filed in Japan on Feb. 8, 2006; the entire contents of which are incorporated herein by reference.

BACKGROUND OF THE INVENTION

1. Field of the Invention

The present invention relates to a raise in reliability of a multilayer wiring structure, and in particular, to a stress analysis method, a wiring structure design method, a program, and a semiconductor device production method.

2. Description of the Related Art

Recently, achievement of lower resistance of wiring resistance, lower dielectric constant of an inter-layer insulating film, etc. are advanced for acceleration of semiconductor devices including LSIs. For example, a material of wiring has transferred to copper (Cu) from aluminum (AL). In addition, low dielectric constant films (low-k films) including a simple silicon oxide film ($SiO_2$ film), an $SiO_2$ film in which fluorine is doped, and an $SiO_2$ film including an organic component have been employed also as an inter-layer insulating film.

A low dielectric constant film is formed by reducing the density of its material, eliminating the polarity in its material, or the like. For example, in order to decrease the density of material, generally the material is made to be porous. Since having a low film density, generally a low dielectric constant film has low mechanical physical property values such as a Young's modulus. That is, a low dielectric constant film has low strength in its material itself.

Furthermore, since a low dielectric constant film has a film structure with low polarity in order to decrease a dielectric constant in the film, the adhesion strength between low dielectric constant films or in a stacked layer interface in a stacked film of a low dielectric constant film and another film is low. For this reason, a material of low dielectric constant film deteriorates easily by, for example, penetration of a gas used when processing a via hole, a trench for wiring, or the like in the low dielectric constant film, or production processes.

As described above, a semiconductor device using a low dielectric constant film has a possibility that the mechanical strength of a material of low dielectric constant film itself deteriorates, or the adhesion strength in the interface of a stacked film including the low dielectric constant film deteriorates.

The weak film strength of such a low dielectric constant film and in particular the weak adhesion strength in the interface of a stacked film including a low dielectric constant film have been a serious obstruction in the multilayering process which forms wiring of a semiconductor device in a multilayer structure. In order to conquer this obstruction, enhancement in reliability is achieved by arranging dummy wiring as reinforcement in a low dielectric constant film (for example, refer to Japanese Patent Laid-Open No. 2003-167929).

A method of determining a form and an arrangement position of dummy wiring is known by a stress analysis using a computer as one of arrangement methods of dummy wiring. The method of dummy metal arrangement using a stress analysis performs the stress analysis in a local portion such as a vicinity of one via, or a vicinity of one pad, and arranges a dummy form according to the result of the stress analysis over a whole chip.

Here, in view of a whole chip, inside of the chip, various regions where the wiring coverage values and wiring forms are different, such as a high density pattern with a high wiring coverage, isolated wiring, or a space section in which a pattern does not exist, are arranged on the basis of a wiring design of the chip. In a boundary section between regions in which the wiring coverage and wiring forms are different, that is, a boundary between different patterns, or a boundary section between a pattern and a space, stress concentration resulting from a design of pattern arrangement is generated. For this reason, defects such as delamination and a crack in a pattern boundary section may be caused.

Nevertheless, in a conventional local stress analysis, it is not possible to derive an analysis result of the stress concentration resulting from a pattern arrangement design by chip. In addition, when faithfully modeling a whole chip up to one via on the basis of the conventional stress analysis method, the total mesh number becomes tens of billions of order, and requires huge computation time.

As described above, in conventional arrangement methods of dummy wiring, since the local stress analysis is performed, it is not possible to perform efficiently an analysis in consideration of stress resulting from a pattern arrangements design of a whole chip. Therefore, since it is not possible to achieve effective dummy arrangement, there is an extremely high possibility that a fatal defect may arise in a pattern boundary section in a heat process and processes, where an external force is applied, such as bonding, and probing. Hence, there is an extremely high possibility that a fatal malfunction may arise in a semiconductor device and its production process. That is, there is a possibility that the performance, quality, and the like of semiconductor devices may deteriorate and the reliability of semiconductor devices may drop. In turn, there is a possibility that faulty semiconductor devices may be produced, a yield of semiconductor devices may drop, and productive efficiency of semiconductor devices may drop.

SUMMARY OF THE INVENTION

A stress analysis method according to one aspect of the present invention includes dividing, by using a division unit, an inside of a chip into a plurality of analysis areas, deriving, by using a composite property derivation unit, a composite property into which physical property values of a plurality of materials included in an analysis area are compounded, about each of the plurality of analysis areas on the basis of wiring structure data for each of the plurality of analysis areas, creating, by using a stress analysis unit, a three-dimensional model of a finite element method which uses each analysis area as an element, to apply the composite property to each element, and to perform a stress analysis.

In addition, a wiring structure design method according to another aspect of the present invention includes dividing, by using a division unit, an inside of a chip into the plurality of analysis areas, deriving, by using a composite property derivation unit, a composite property into which physical property values of the plurality of materials included in an analysis area are compounded, about each of the plurality of analysis areas on the basis of wiring structure data for each of the plurality of analysis areas, creating, by using a stress analysis unit, a three-dimensional model of a finite element method which uses each analysis area as an element, to apply the composite property to each element, and to perform a first stress analysis, extracting, by using a critical region extraction unit, a critical region from the plurality of analysis areas on the basis of stress values obtained as a result of the first stress analysis, arranging, by using a dummy metal arrangement unit, a dummy metal in the critical region, and creating, by using a CAD data creation unit, CAD data of the chip where the dummy metal is arranged.

In addition, a program product according to still another aspect of the present invention makes a computer execute instructions for a division unit to divide an inside of a chip into a plurality of analysis areas, a composite property derivation unit to derive a composite property into which physical property values of a plurality of materials included in an analysis area are compounded, about each of the plurality of analysis areas on the basis of wiring structure data for each of the plurality of analysis areas, a stress analysis unit to create a three-dimensional model of a finite element method which uses each analysis area as an element, to apply the composite property to each element, and to perform a stress analysis.

Furthermore, a semiconductor device production method according to a further aspect of the present invention includes dividing an inside of a chip into a plurality of analysis areas, deriving a composite property into which physical property values of a plurality of materials included in an analysis area are compounded, about each of the plurality of analysis areas on the basis of wiring structure data for each of the plurality of analysis areas, creating a three-dimensional model of a finite element method which uses each analysis area as an element, applying the composite property to the respective element, performing a stress analysis, and determining presence or absence of a critical region in the plurality of analysis areas on the basis of stress values obtained as a result of the stress analysis, wherein in a case where presence of the critical region is determined, after arranging a dummy metal in the critical region, again determining presence or absence of a critical region in the plurality of analysis areas generated by dividing the inside of the chip on the basis of wiring structure data in which the dummy metal is arranged, and forming a wiring structure of a semiconductor device in the chip according to wiring structure data in which absence of the critical region in the chip is determined.

BRIEF DESCRIPTION OF THE DRAWINGS

FIG. 7 is a schematic diagram showing an example of critical regions before dummy metal arrangement in the finite element model shown in FIG. 6 according to the embodiment of the present invention;

FIGS. 14A to 14H are schematic diagrams showing examples of dummy metal structures according to the third modified example of the embodiment of the present invention;

DETAILED DESCRIPTION OF THE PREFERRED EMBODIMENTS

Next, embodiments of the present invention will be explained with reference to drawings. In description of the following drawings, the same or similar symbols are assigned to the same or similar parts. Nevertheless, since drawings are schematic and it should be noted that relationship between thickness and plane sizes, ratios of thicknesses of respective layers, and the like are different from the real. Hence, in consideration of the following explanations, specific thickness and specific dimensions should be judged. Moreover, it is needless to say that portions whose dimensional relationship and ratios are mutually different in drawings are included.

In addition, the embodiments shown below just illustrate apparatuses and methods for actualizing technical idea of the present invention, and the technical idea of the present invention does not specify materials, forms, structures, arrangement, and the like of constituents as the followings. The technical idea of the present invention can be modified variously in the scope of claims.

Figure 1:
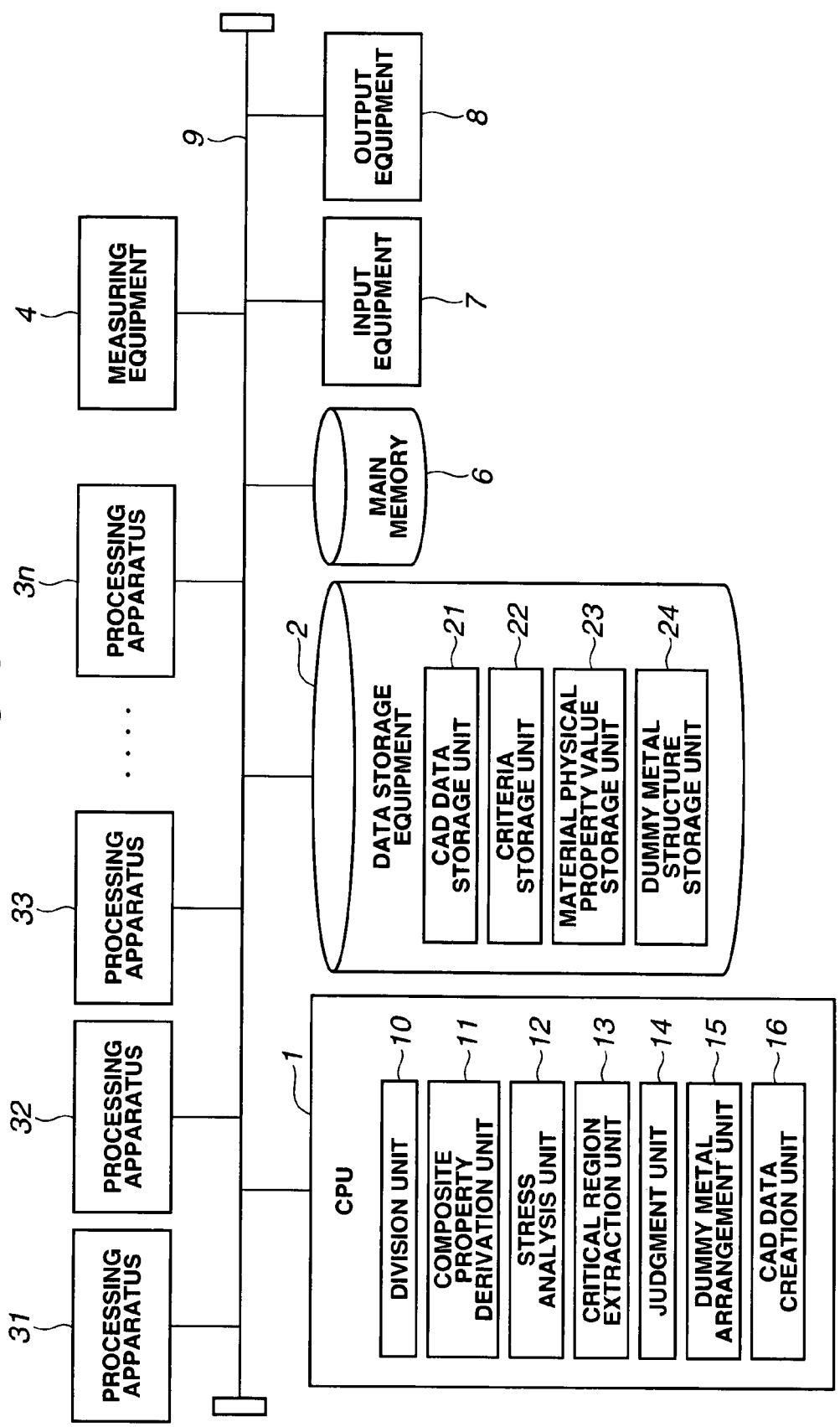
FIG. 1 is a block diagram showing an example of a semiconductor device production system according to an embodiment of the present invention.

As shown in FIG. 1, a semiconductor device production system using a semiconductor device production method according to the embodiments of the present invention includes a central processing unit (CPU) 1, data storage equipment 2, and processing apparatuses 31, 32, 33 . . . 3n, measuring equipment 4, a main memory 6, input equipment 7, and output equipment 8. The CPU 1, the data storage equipment 2, the processing apparatuses 31, 32, 33 . . . 3n, the measuring equipment 4, the main memory 6, the input equipment 7, and the output equipment 8 are connected mutually through a predetermined communication network such as a bus 9. As the communication network, the Internet, a LAN, a wireless LAN, and the like are also adoptable. By means of the communication network, it is possible to obtain suitable information even from a remote place and further to obtain real time information.

The processing apparatuses 31, 32, 33 ... 3n include various semiconductor production apparatuses such as an ion implanter, impurity dispersion equipment, a thermal oxidation furnace forming an $SiO_2$ film, a chemical vapor phase deposition (CVD) apparatus depositing an $SiO_2$ film, a phosphorus glass (PSG) film, a boron glass (BSG) film, a boron phosphorus glass (BPSG) film, a silicon nitride film ($Si_3N_4$ film), a polysilicon film, and the like, a thermal processing apparatus performing reflow (melting) of a PSG film, a BSG film, a BPSG film, and the like, a thermal processing apparatus densifying a CVD oxide film and the like, a thermal processing apparatus forming a silicide film and the like, a sputtering system depositing a metallic wiring layer, a vacuum evaporation apparatus, furthermore, a plating process apparatus forming a metallic wiring layer by plating, a chemical and mechanical polishing (CMP) apparatus which grinds the surface of a semiconductor substrate, a dry or wet etching apparatus etching a semiconductor substrate surface, a cleaning apparatus removing resist and cleaning using a solvent, a spin coating apparatus (spinner) relating to photolithographic processing, an exposing apparatus such as a stepper, a dicing apparatus, a bonding apparatus connecting to a lead frame electrodes of a chip-shaped semiconductor device which is diced.

Furthermore, the semiconductor production apparatuses may include incidental facilities, such as a deionized water processing apparatus and a gas purification apparatus. Moreover, these semiconductor production apparatuses are applicable to either batch processing apparatuses or single-wafer type apparatuses. A batch processing apparatus or a single-wafer type apparatus may be applied also to all the embodiments mentioned later similarly.

The measuring equipment 4 is equipment which can perform various types of measurement and inspection such as fracture criterion measurement. What are usable as the measuring equipment 4 are, for example, microscopes such as an optical microscope, a scanning electron microscope (SEM), a laser microscope, or an atomic force microscope (AFM), an electric furnace for an annealing experiment, a nano indenter for a nano indenter test, a 4PB (4 Points Bending) evaluation apparatus for interfacial peeling strength measurement, a DCB (Double Cantilever Bending) evaluation apparatus, an m-ELT (Modified Edge Liftoff Test) testing device, a nano scratch test apparatus, and a probe for a probing test.

The data storage equipment 2 is equipped with a CAD data storage unit 21 configured to store CAD data, a criteria storage unit 22 configured to store fracture criteria at which defects such as insulating layer breakdown occur respectively to various loads, a material physical property value storage unit 23 configured to put material physical property values, such as Young's moduli and coefficients of linear expansion of various insulating layer materials, wiring materials, and the like which are used for a semiconductor device in a database, and a dummy metal structure storage unit 24 configured to collect dummy metal structures with various forms and coverage values and put them in a database.

The CPU 1 is equipped with a division unit 10, a composite property derivation unit 11, a stress analysis unit 12, a critical region extraction unit 13, a judgment unit 14, a dummy metal arrangement unit 15, and a CAD data creation unit 16.

Figure 2:
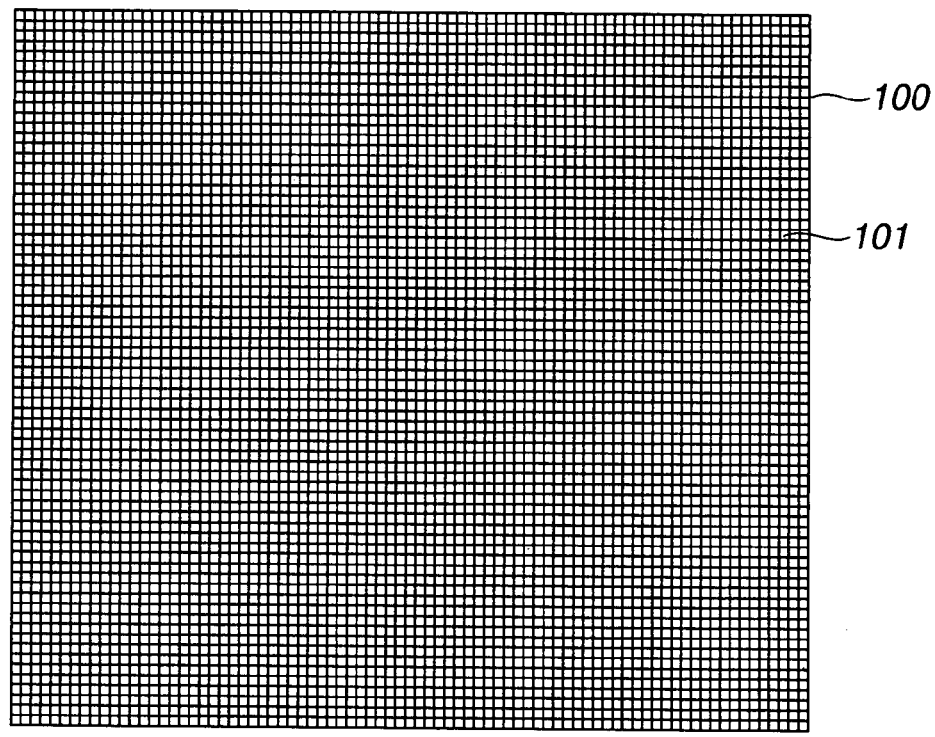
FIG. 2 is a schematic diagram showing an example of chip data according to the embodiment of the present invention.

The division unit 10 reads data of a chip, which is an object, from the CAD data storage unit 21, and divides the chip into a plurality of regions (analysis areas). The division unit 10, for example, divides a chip 100 with a plane size of 22 mm×19 mm into square regions (analysis areas) 101 with a size of 200 μm×200 μm, as shown in FIG. 2. In this case, the total number of the analysis areas becomes 10450.

Figure 3:
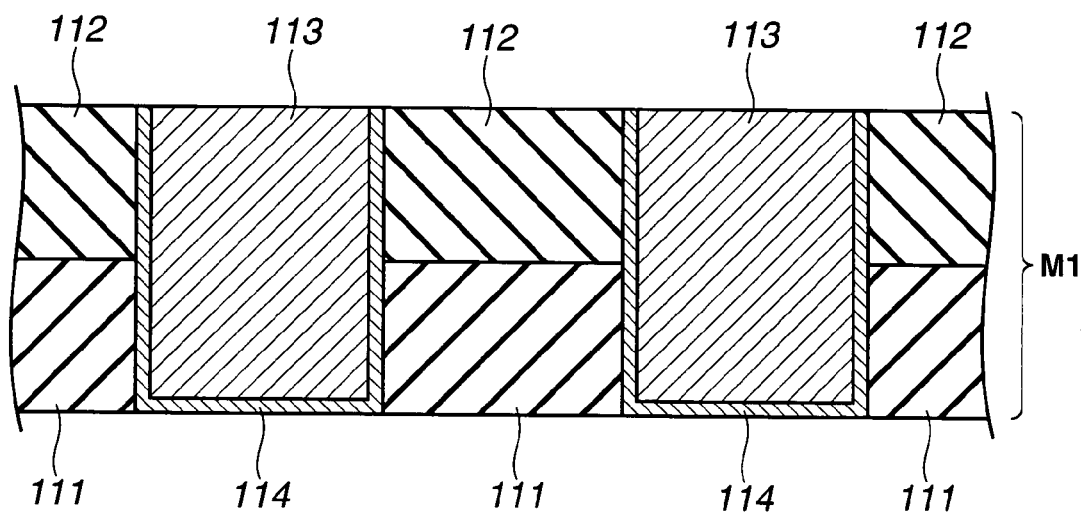
FIG. 3 is a sectional view showing an example of a wiring layer of the chip of the embodiment of the present invention.

The composite property derivation unit 11 shown in FIG. 1 reads CAD data, which relates to wiring structures in the chip 100, from the CAD data storage unit 21, and extracts wiring structure data, such as a wiring coverage, a wiring width, and a wiring length. The composite property derivation unit 11, for example, extracts the wiring structure data in a wiring layer M1 as shown in FIG. 3. The wiring layer M1 has, for example, a layered structure of first wiring 113 made of 90-nm-thick copper (Cu), and second wiring (a barrier metal layer) 114 made of 10-nm-thick titanium (Ti). In addition, an inter-layer insulating film is arranged between the layered structures of the first wiring 113 and second wiring 114. The inter-layer insulating film has, for example, a layered structure of a 50-nm-thick first insulating layer (poly methyl siloxane film) 111 and a 50-nm-thick second insulating layer ($SiO_2$ film) 112.

Furthermore, the composite property derivation unit 11 derives composite property into which physical property values of a plurality of materials included in the analysis areas 101 are compounded, in each of a plurality of analysis areas 101 using rules of mixture on the basis of the extracted wiring structure data. At this time, the composite property derivation unit 11 extracts a material physical property value from the material physical property value storage unit 23 and uses it. For example, a composite Young's modulus and a composite coefficient of linear expansion of an analysis area 101 are expressed by formulas (1) and (2) as the composite property, respectively.

$$Ec = E_M \times R + E_{ILD} \times (1-R) \quad (1)$$

$$\alpha c = \alpha_M \times R + \alpha_{ILD} \times (1-R) \quad (2)$$

where Ec; composite Young's modulus, Eg; Young's modulus of wiring material, $E_{ILD}$; Young's modulus of inter-layer insulating film material, αc; composite coefficient of linear expansion, $\alpha_M$; coefficient of linear expansion of wiring material, $\alpha_{ILD}$; coefficient of linear expansion of inter-layer insulating film material, and R: wiring coverage in analysis area 101. In addition, when the wiring or inter-layer insulating film includes two or more materials, formulas (3), (4), (5), and (6) are applied.

$$E_M = \sum_1 E_{Mi} \times R_{Mi} \quad (3)$$

$$E_{ILD} = \sum_1 E_{ILDi} \times R_{ILDi} \quad (4)$$

$$\alpha_M = \sum_1 \alpha_{Mi} \times R_{Mi} \quad (5)$$

$$\alpha_{ILD} = \sum_1 \alpha_{ILDi} \times R_{ILDi} \quad (6)$$

where $E_{Mi}$; Young's modulus of i-th material which constructs wiring, $E_{ILDi}$; Young's modulus of i-th material which constructs inter-layer insulating film, $\alpha_{Mi}$; coefficient of linear expansion of i-th material which constructs wiring, $\alpha_{ILDi}$; coefficient of linear expansion of i-th material which constructs inter-layer insulating film, $R_{Mi}$; volume ratio of i-th material which constructs wiring, $R_{ILDi}$; volume ratio of i-th material which constructs inter-layer insulating film (i is a positive integer).

In formulas (1) to (6), the wiring coverage (R) in the analysis area 101 may be expressed approximately. For example, by expressing 0% or more and less than 5% of wiring coverage as a round number R=0%, 5% or more and less than 15% as a round number R=10%, 15% or more and less than 25% as round number R=20%, 25% or more and less than 35% as a round number R=30%, 35% or more and less than 45% as round number R=40%, 45% or more and less than 55% as a round number R=50%, 55% or more and less than 65% as a round number R=60%, 65% or more and less than 75% as a round number R=70%, 75% or more and less than 85% as a round number R=80%, 85% or more and less than 95% as a round number R=90%, and then, 95% or more as a round number R=100%, a model may be described with 11 kinds of composite physical property values.

Cu which is a material of the first wiring 113 has a Young's modulus; 150 GPa, and a coefficient of linear expansion: $16 \times 10^{-6}$. Ti which is a material of the second wiring 114 has a Young's modulus; 180 GPa, and a coefficient of linear expansion: $7 \times 10^{-6}$. A polymethylsiloxane film of the first insulating film 111 has a Young's modulus; 4 GPa, and a coefficient of linear expansion: $60 \times 10^{-6}$. An $SiO_2$ film of the second insulating film 112 has a Young's modulus; 60 GPa, and a coefficient of linear expansion: $1 \times 10^{-6}$.

In the embodiments of the present invention, since the volume of the second wiring 114 is small enough in comparison with that of the first wiring 113, the values of Cu of the first wiring 113 are used for the Young's modulus and coefficient of linear expansion of wiring materials, respectively. Of course, it is also satisfactory to derive the Young's modulus and coefficient of linear expansion of wiring materials from formulas (3) to (6) using the volume ratio of the first wiring 113 and the second wiring 114 without omitting the physical property value of Ti of the second wiring 114 and to use them for an analysis.

On the other hand, as for the insulating film materials, the Young's modulus of insulating layer materials is 32 GPa from formula (4) using the volume ratio of the first insulating layer 111 and the second insulating layer 112, and the coefficient of linear expansion is $31 \times 10^{-6}$ from formula (6). By substituting these values to formulas (1) and (2), as for composite physical property values of the analysis area 101 with, for example, 50% of wiring coverage, a composite Young's modulus Ec=91 GPa, and a composite coefficient of linear expansion $\alpha c=24 \times 10^{-6}$ hold.

In addition, since those except the Young's modulus and coefficient of linear expansion also exist as composite physical property values, what is necessary is just to extract and use desired material physical property values. In particular, a Poisson's ratio is cited as one relating to a stress analysis in the embodiments of the present invention. Nevertheless, since dependency of a Poisson's ratio on a material is small, in the embodiments of the present invention, the Poisson's ratio is assumed to be 0.3 for all the materials. Of course, it is satisfactory to derive composite property according to the method of deriving the composite Young's modulus and composite coefficient of linear expansion also for the Poisson's ratio and to use them for an analysis. In addition, also about physical property values other than the Young's modulus, coefficient of linear expansion, and Poisson's ratio, it is possible to derive composite property using similar methods, and to use them for analyses.

The stress analysis unit 12 shown in FIG. 1 creates a three-dimensional model of a finite element method which uses each analysis area as an element, applies the composite property (composite Young's modulus Ec and composite coefficient of linear expansion $\alpha c$) derived by the composite property derivation unit 11 using formulas (1) and (2) to each element, and creates a three-dimensional model (finite element model) of a finite element method of the whole chip 100.

Figure 4:
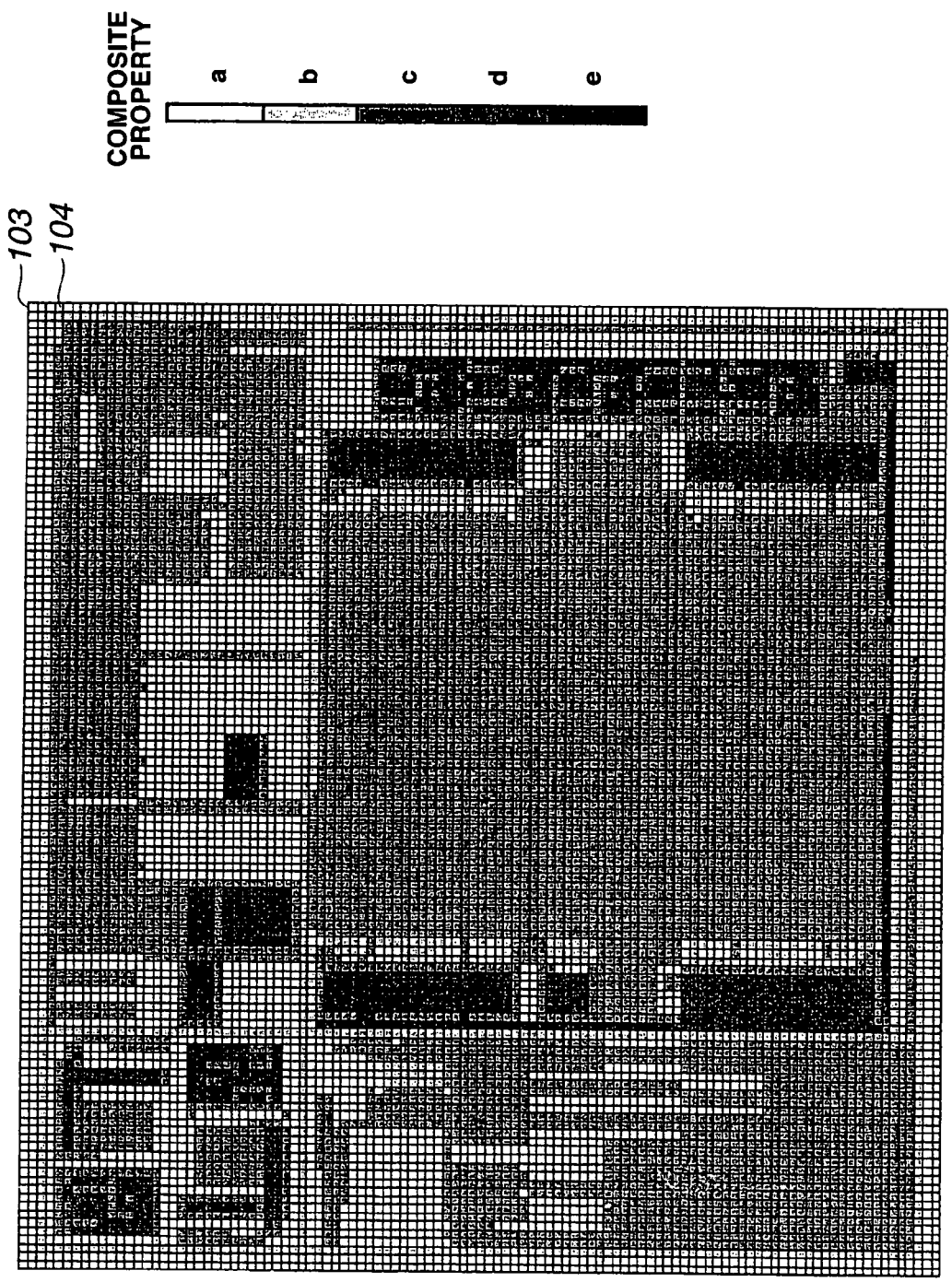
FIG. 4 is a schematic diagram showing an example of a finite element model in an analysis area size of 200 µm×200 µm in the embodiment of the present invention.

For example, as shown in FIG. 4, a finite element model 103 with a plane size of 22 mm×19 mm, and a thickness of 100 nm same as the thickness of the wiring layer M1, which is divided into elements 104 with a size of 200 μm×200 μm in an inplane direction is created. With making one element 104 one analysis area, composite property which correspond respectively are applied to each element (analysis area) 104.

FIG. 4 shows physical property values derived from the round numbers of respective wiring coverages as the composite property a, b, c, d, using the wiring coverages expressed in the round numbers every 25% respectively. Thus, let 0% or more and less than 12.5% be a round number R=0%, and a physical property value derived from this is expressed as a composite property a, let 12.5% or more and less than 37.5% be a round number R=25%, and a physical property value derived from this is expressed as a composite property b, let 37.5% or more and less than 62.5% be a round number R=50%, and a physical property value derived from this is expressed as a composite property c, let 62.5% or more and less than 87.5% be a round number R=75%, and a physical property value derived from this is expressed as a composite property d, let 87.5% or more be around number R=100%, and a physical property value derived from this is expressed as a composite property e, and a model is expressed with five composite property. The finite element model 103 of the whole chip 100 in which the wiring layer M1 exists on a Si substrate is completed by stacking this model of the wiring layer M1 on a model of the Si substrate which is omitted from illustration, Furthermore, the stress analysis unit 12 performs a stress analysis at the time of applying various loads to the chip 100 for the finite element models 103. For example, the stress analysis at the time of applying a heat load to the chip 100 is performed by increasing temperature from room temperature to 450° C. The number of elements of the finite element model 103 created by the method using the rules of mixture as shown in formulas (1) to (6) is about 20,000, but, on the other hand, when wiring forms and insulating layer forms are faithfully modeled by a conventional method, the number of elements becomes about several hundred billion for the whole chip 100. Since it is conceivable in the finite element method that computation time increases in proportion to the square to cube of the number of elements, it becomes possible to reduce the computation time remarkably by using the finite element model 103 created using the rules of mixture.

The critical region extraction unit 13 shown in FIG. 1 extracts a fracture criterion of a desired insulating film at the time of applying a heat load, from the criteria storage unit 22. Values of fracture criteria, at which defects such as an insulating film breakdown arise, are respectively gathered together for various loads in the criteria storage unit 22. In breakdowns such as a crack of an insulating film, plastic deformation such as a void and a hillock of metal wiring, there is each stress threshold (fracture criterion) for the phenomenon to occur. These fracture criteria have unique values according to materials and fracture modes. For example, when a vertical load is applied to an $SiO_2$ film and a crack is generated, the crack is generated when tension stress generated in the $SiO_2$ film exceeds 4 GPa. Or, in order that interface delamination between a silicon nitride film and an $SiO_2$ film arises, a value of energy release rate which is one of fracture mechanical parameters must exceed 8 $J/m^2$. In addition, in order that plastic deformation arises at 400° C. in Cu wiring, Mises's stress needs to exceed 200 MPa which is an yield condition. When a material and a fracture mode are the same respectively, values of these fracture criteria are not dependent on difference in a form and a structure, but are approximately constant. Thus, when one sample is produced, a fracture criterion is measured, and a fracture criterion for a desired material and a desired fracture mode is determined, also in other samples whose wiring width, film thickness, multi-layer structures, etc. are different, so long as a material and a fracture mode are the same respectively, it is possible to use the same fracture criterion. By measuring fracture criteria for materials used in LSIs and for fracture modes supposed to occur in processes, and putting them in a database, it becomes possible to extract critical regions in semiconductor devices having various forms and multi-layer structures.

As for measurement of a fracture criterion, it is satisfactory to use a method of producing a semiconductor device with a desired wiring structure and a multi-layer structure, generating a defect by an acceleration test etc., and determining the fracture criterion, or to use an evaluation technique of producing a sample with a simplified structure by using the property of "a fracture criterion has a unique value according to a material and a fracture mode", and simulating a desired defect to determine the fracture criterion. For example, in the case of a defect that a crack arises in an insulating film which contacts a via sidewall by thermal stress generated in a via section during a heat process, what is necessary is just to produce a sample which has at least one via to which top and bottom wiring is connected, using a desired insulating film and a wiring material.

Figure 5:
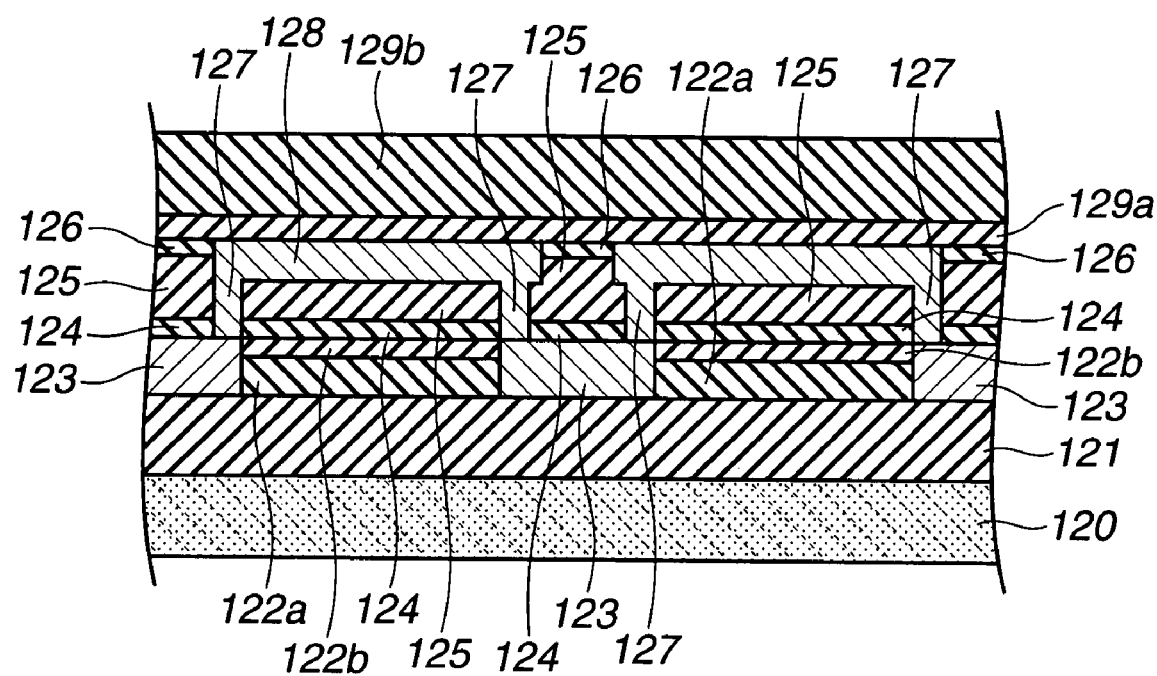
FIG. 5 is a sectional view showing an example of a structure for explaining criteria measurement according to the embodiment of the present invention.

For example, as an example of fracture criterion measurement, fracture criterion measurement for a defect that a crack arises in an insulating film, which contacts a via sidewall, by thermal stress generated in a via section during a heat process will be explained. FIG. 5 shows a structure of a via chain sample with 1000 vias produced for the fracture criterion measurement. As shown in FIG. 5, a silicon oxide film 121, a polymethylsiloxane film 122*a*, and a silicon oxide film 122*b* are sequentially formed on a Si substrate 120, and a lower wiring layer 123 is formed between the polymethylsiloxane film 122*a* and the silicon oxide film 122*b*. In the lower wiring layer 123, although being omitted in the drawing, Ta is used as a barrier metal and Cu is used as a conductive material. A silicon nitride film 124, a polymethylsiloxane film 125, and a silicon oxide film 126 are sequentially formed on the silicon oxide film 122*b* and lower wiring layer 123 by plasma CVD. Via holes connected to the lower wiring layer 123 are formed in the silicon nitride film 124, the polymethylsiloxane film 125, and the silicon oxide film 126. Wiring trenches are formed in a region including the via holes in the polymethylsiloxane film 125 and silicon oxide film 126. Via plugs 127 and an upper wiring layer 128 are embedded and formed in the via holes and wiring trenches using Ta as a barrier metal, and Cu as a conductive material, and a via chain is produced. A silicon nitride film 129*a* and a silicon oxide film 129*b* which are formed by plasma CVD as a stacked layer overcoat on the via chain are arranged. On this sample, an annealing experiment is conducted using an electric furnace. Annealing in a forming gas for 60 minutes is performed with changing temperature in a range of 150° C. to 450° C. Presence of an insulating film breakdown in the via section is observed using an optical microscope after the annealing. Consequently, the insulating film breakdown is observed after annealing at 400° C. and 450° C. On the other hand, the stress analysis unit 12 creates a finite element model which simulates the structure of the sample with which the annealing experiment was conducted, and a stress analysis at the time of temperature increase up to 450° C. is performed using the finite element model. The stress value arising in the insulating film of the via sidewall section at 400° C. obtained as a result of the stress analysis becomes a fracture criterion at the time of crack occurrence, caused by the thermal stress, in the polymethylsiloxane film.

Furthermore, the critical region extraction unit 13 compares a result (stress value) of the stress analysis by the stress analysis unit 12 with the extracted fracture criterion for all the analysis areas 101, and extracts analysis areas 101, where the stress values are larger than the fracture criterion, as "critical regions" with high possibilities that defects arise when a heat load is applied. For example, the result of the stress analysis up to 450° C. in the finite element model 103 shown in FIG. 4 is compared with the fracture criterion, which is used for the breakdown due to thermal stress and extracted from the criteria storage unit 22, for all the analysis areas 101.

Here, a zooming analysis may be further performed on the extracted critical regions. The zooming analysis is a method of extracting a part of elements created by coarse element breakdown, modeling only the extracted element further by more detailed element breakdown, and analyzing it. Since an analysis output in the coarse element breakdown can be made to be reflected as boundary conditions at the time of analysis in the detailed element breakdown, it is possible to perform a highly accurate analysis efficiently with the small number of elements.

In the zooming analysis, for example, a region of 5 mm×5 mm is extracted centering the critical region of 200 µm×200 µm, which is obtained from the stress analysis by the element breakdown and is shown in FIG. 4 and an analysis by element breakdown every 50 µm×50 µm is performed. The division unit 10 divides into regions (analysis areas) of 50 µm×50 µm the region (zooming region) of 5 mm×5 mm extracted centering the critical region. The total number of regions becomes 10000. The composite property derivation unit 11 extracts wiring structure data in the zooming region from the CAD data stored in the CAD data storage unit 21, and derives composite property every analysis area using the rules of mixture on the basis of the wiring structure data. The stress analysis unit 12 creates a three-dimensional model of the finite element method which uses each analysis area as an element, applies each composite property to each corresponding element to create a finite element model of the whole chip, and performs the stress analysis of the zooming region with increasing temperature from room temperature to 450° C. about the obtained finite element model. The critical region extraction unit 13 compares a result (stress values) of the stress analysis by the stress analysis unit 12 with the fracture criterion, which is used for the breakdown due to thermal stress and extracted from the criteria storage unit 22, for all the analysis areas, and extracts analysis areas, where the stress values are larger than the fracture criterion, as "critical regions". By virtue of the critical regions extracted in this way, it becomes possible to obtain a result which is more detailed and more precise than the critical regions extracted in the analysis by the element breakdown every 200 µm×200 µm.

Figure 6:
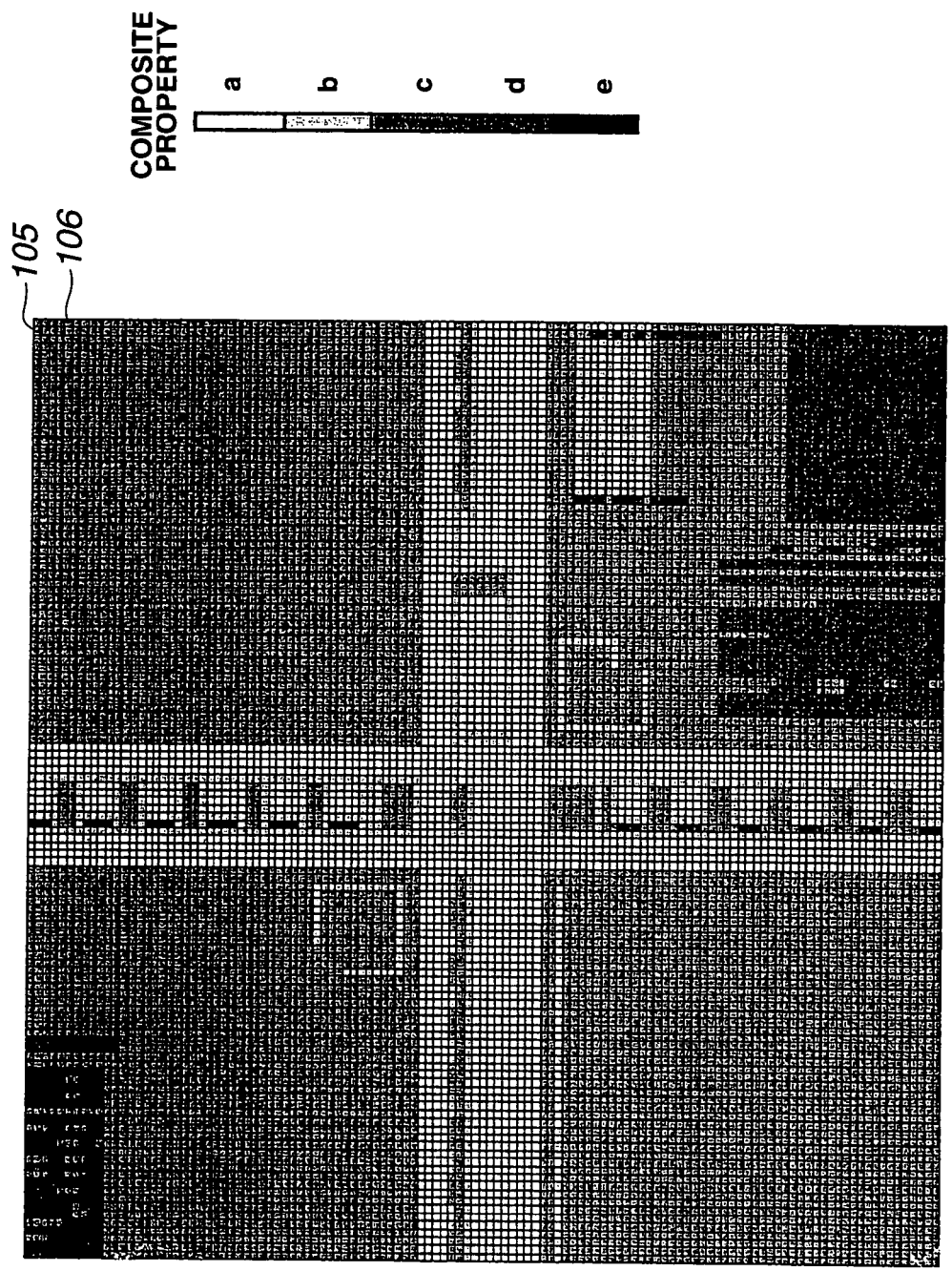
FIG. 6 is a schematic diagram showing an example of a zooming analysis model in an analysis area size of 10 µm×10 µm in the embodiment of the present invention.

In addition, the zooming analyses may be repeated a plurality of times. For example, it is also allowed to extract a region of 1 mm×1 mm further centering the critical region, which is obtained by the zooming analysis by the element breakdown every 50 µm×50 µm and, and to perform another zooming analysis by element breakdown every 10 µm×10 µm. The total number of regions is 10000 also in this case. A finite element model 105 in this second zooming analysis is shown in FIG. 6. The finite element model 105 is divided into analysis areas 106. The stress analysis unit 12 performs a stress analysis similarly to the first zooming analysis, and the critical region extraction unit 13 extracts an analysis area 106, where the stress value is larger than the fracture criterion, as a critical region, as shown in FIG. 7 about the finite element model 105 shown in FIG. 6.

Furthermore, when a plurality of critical regions are extracted on the occasion of the stress analysis of the whole chip 100 by the element breakdown every 200 μm×200 μm which is performed at the beginning, the zooming analyses are performed to respective critical regions. By repeating the zooming analyses a plurality of times in this way, a detailed analysis becomes possible without increasing the number of elements. Finally, the zooming analyses may be repeated until it reaches the finite element model in which the rules of mixture are not used, that is, which reproduce CAD data faithfully up to one via and one line of wiring.

The judgment unit 14 shown in FIG. 1 judges presence of a critical region extracted by the critical region extraction unit 13. When a critical region exists, this chip 100 is judged as a defective article, and when a critical region does not exist, a wiring structure of the chip 100 is judged as a good article.

The dummy metal arrangement unit 15 selects one dummy metal structure from dummy metal structures having various forms, sizes, and coverage values respectively, which are stored in the dummy metal structure storage unit 24. The dummy metal structure storage unit 24 stores, for example, a dot-shaped dummy metal structure 131 shown in FIG. 8A, a cross-shaped dummy metal structure 132 shown in FIG. 8B, an L-shaped dummy metal structure 133 shown in FIG. 8C, and a T-shaped dummy metal structure 134 shown in FIG. 8D. Furthermore, it also stores a structure having a pillar-shaped via, a structure having a via layer trench, etc. for each structure.

Figures 8A, 8B, 8C, 8D:
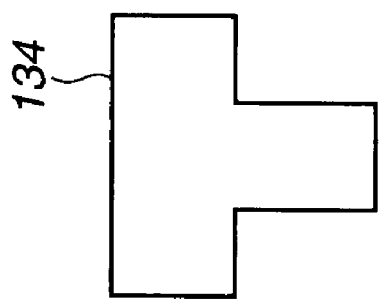
FIGS. 8A to 8D are schematic diagrams showing examples of dummy metal structures according to the embodiment of the present invention.

The dummy metal arrangement unit 15 selects, for example, the dot-shaped dummy metal structure 131 shown in FIG. 8A. Furthermore, the dummy metal arrangement unit 15 arranges the selected dummy metal structure 131 in the critical region which is extracted by the critical region extraction unit 13. Although a dummy metal structure may be selected at random using a computer etc. when selecting it from the dummy metal structure storage unit 24, it becomes possible to terminate an analysis for a shorter time by selecting a plurality of dummy metal structures with high priorities beforehand in view of resistance to a desired fracture mode, simplicity of processes, etc., and grouping the dummy metal structures in this database to preferentially select a dummy metal structure in the group.

The CAD data creation unit 16 shown in FIG. 1 creates new CAD data which relates to wiring structures after dummy metal arrangement. It performs an analysis again with making the new CAD data a starting point, and extracts a critical region. When a critical region exists again, it selects another dummy metal structure, for example, the dummy metal structure 132 from the dummy metal structure storage unit 24, replaces the dummy metal structure 131 for it, creates CAD data which relates to a wiring structure after arrangement of the dummy metal structure 132, and performs the analyzes again. This is repeated until a critical region disappears.

What are usable as the input equipment 7 are, for example, identifiers, such as a keyboard, a mouse, and an optical character reader (OCR), graphic input equipment, such as an image scanner, and special input equipment, such as an audio input unit. What are usable as the output equipment 8 are display units, such as a liquid crystal display and a Braun tube (CRT) display, printers, such as an ink jet printer and a laser printer, and the like.

ROM and RAM are incorporated in the main memory 6. The ROM functions as a program storage which stores programs executed in the CPU 1 (detail of the programs will be mentioned later). The RAM temporarily stores data used during program execution processing in the CPU 1, or functions as temporary data memory used as a working area, and the like. What are adoptable as the main memory 6 are, for example, semiconductor memory, a magnetic disk, an optical disk, a magneto-optical disk, a magnetic tape, etc.

Next, a wiring structure design method including the stress analysis method according to an embodiment of the present invention will be explained with referring to a flowchart of FIG. 9.

At step S10, as shown in FIG. 2, the division unit 10 divides the object chip 100 into a plurality of 10 to 200-μm regions (analysis areas) 101.

At step S11, the composite property derivation unit 11 extracts wiring structure data, such as a wiring coverage, a wiring width, and a wire length from CAD data which relates to wiring structures in the chip 100 and is stored in the CAD data storage unit 21. At step S12, the composite property derivation unit 11 derives composite property into which physical property values of a plurality of materials included in an analysis area 101 are compounded, in each of the plurality of analysis areas 101 using the rules of mixture, expressed in formulas (1) to (6), on the basis of the wiring structure data. At this time, a desired material physical property value is extracted from the material physical property value storage unit 23 and used properly.

At step S13, the stress analysis unit 12 creates a three-dimensional model of the finite element method which uses each analysis area 101 as an element, applies the derived composite property to each corresponding element, and, as shown in FIG. 4, creates the finite element model 103 of the whole chip 100. At step S14, the stress analysis unit 12 performs a stress analysis at the time of applying a heat load to the created finite element model 103.

At step S15, a fracture criterion of a defect in the chip 100 is derived by real measurement using the measuring equipment 4. Note that, fracture criteria may be beforehand stored in the criteria storage unit 22, and may be actually measured at any time using the measuring equipment 4 if needed. At step S16, the critical region extraction unit 13 extracts a fracture criterion of a desired insulating film at the time of applying a heat load from values of the fracture criteria for various loads stored in the criteria storage unit 22. Furthermore, the critical region extraction unit 13 compares stress values obtained as a result of the stress analysis by the stress analysis unit 12 with the extracted fracture criterion, and extracts analysis areas 106, where the stress values are larger than the fracture criterion, as critical regions, as shown in FIG. 7.

At step S17, the judgment unit 14 judges presence of the critical regions extracted by the critical region extraction unit 13. When judging that a critical region is not extracted, the judgment unit 14 judges that the wiring structure of the chip 100 is a good article to complete the processing. On the other hand, when judging that a critical region is extracted, the judgment unit 14 judges that the wiring structure of the chip 100 is a defective article, and advances to step S18.

At step S18, the dummy metal arrangement unit 15 selects a dummy metal structure from the dummy metal structures stored in the dummy metal structure storage unit 24, and arranges the selected dummy metal in the critical region which is extracted by the critical region extraction unit 13.

At step S19, the CAD data creation unit 16 creates CAD data which relates to the wiring structure after dummy metal arrangement. The process returns to step S10 to perform a stress analysis for the CAD data which relates to the structure after dummy metal arrangement. The result is compared with the fracture criterion and a critical region is extracted. When a critical region does not exist here, the wiring structure of the chip 100 becomes a good article by this dummy metal arrangement, and the analysis is completed. On the other hand, when a critical region exists, another dummy metal is arranged from the dummy metal structure storage unit 24, and a series of analyses are performed again. In this way, the procedures of steps S10 to S14, and S16 to S19 are repeated until the critical regions disappear.

When dummy metals are optimized using a method of actually producing samples where forms, coverage values, and arrangement of dummy metals are changed, actually conducting an annealing experiment, and deciding most effective dummy metal arrangement, time for several months, and cost of masks and lot production are required. In addition, also even when performing optimization by means of a stress analysis using a computer, when a conventional method of modeling which does not use the rules of mixture is used, in order to analyze a whole chip, the number of elements will become tens of billions of order, and will require huge computation time. On the other hand, when analyzing only a local portion in a chip in order to reduce computation time, it is not possible to perform a stress analysis resulting from a pattern arrangement design of the whole chip.

As opposed to this, according to the wiring structure design method including the stress analysis method in accordance with the embodiment of the present invention, it becomes possible to reduce greatly both of time and cost which are required for optimization of effective dummy metal arrangement in order to suppress an insulating film breakdown defect due to a heat load, and to perform efficiently an analysis in consideration of a stress resulting from the pattern arrangements design of the whole chip. Furthermore, according to the wiring structure design method including the stress analysis method in accordance with the embodiment of the present invention, it becomes possible to greatly reduce both of time and cost which are required for optimization of dummy metal arrangement in order to suppress a fatal defect arising in a pattern boundary section also in processes where external forces are applied, such as bonding and probing, and to perform efficiently an analysis in consideration of a stress resulting from the pattern arrangements design of the whole chip. In consequence, it is possible to suppress the fatal malfunctions arising in a semiconductor device and its production processes. That is, it is possible to achieve higher performance and quality of semiconductor devices, and enhancement in reliability of semiconductor devices. In turn, it is possible to raise a yield of semiconductor devices and to increase productive efficiency of semiconductor devices.

In addition, it is also possible to derive a plurality of dummy metals in which a critical region does not exist by not ending an analysis even after one dummy metal in which a critical region does not exist is derived, but repeating the analysis further. In that case, any structure may be selected from the derived dummy metals as a structure actually used as a dummy metal. In addition, the actually used dummy metal may be selected from among the derived dummy metals so as to fulfill another condition. For example, when selecting a dummy metal in consideration of convenience of a design or processes, a structure where there is no via and a coverage of the dummy metal is lower is selected. In this way, it is possible to obtain a highly practical dummy metal more efficiently in a short time by performing grouping also in consideration of objects other than achievement of higher reliability, such as the convenience of the design and processes, at the time of grouping in the dummy metal structure storage unit 24.

Figure 9:
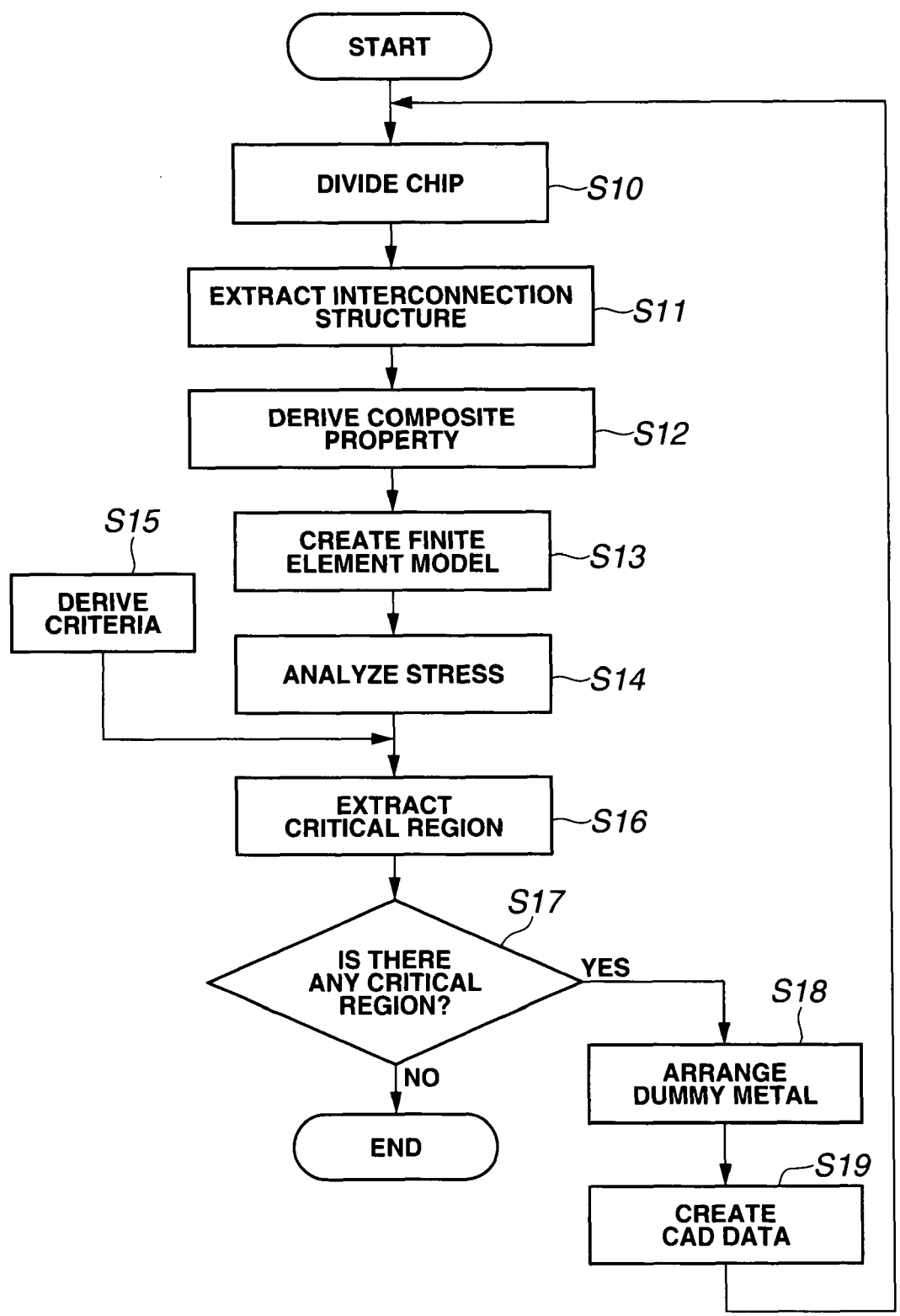
FIG. 9 is a flowchart (algorithm) for explaining an example of a wiring structure design method according to the embodiment of the present invention.

Moreover, it is possible by a program with algorithm equivalent to FIG. 9 controlling the CPU 1 shown in FIG. 1 to execute a series of procedures shown in FIG. 9, that is, an instruction for the division unit 10 to divide an inside of a chip into the plurality of analysis areas, at step S10; an instruction for the composite property derivation unit 11 to derive composite property into which physical property values of the plurality of materials included in an analysis area are compounded, about each of the plurality of analysis areas on the basis of wiring structure data for each of the plurality of analysis areas, at steps S11 and S12; an instruction for the stress analysis unit 12 to create a three-dimensional model of a finite element method which uses each analysis area as an element, to apply the composite property to each element, and to perform a stress analysis, at steps S13 and S14; an instruction for the critical region extraction unit 13 to extract a critical region from the plurality of analysis areas on the basis of stress values obtained as a result of the stress analysis, at steps S15 and S16; an instruction for the dummy metal arrangement unit 15 to arrange a dummy metal in the critical region, at step S17; an instruction for the CAD data creation unit 16 to create CAD data of the chip where the dummy metal is arranged, at step S18; and the like. This program may be stored in the main memory 6 or the like. In addition, it is possible to execute a series of procedures of the embodiment of the present invention by storing this program in a computer-readable recording medium, and having this recording medium read into the main memory 6. Here, the "computer-readable recording medium" means, for example, a medium which can record the program, such as an external memory apparatus of computer, semiconductor memory, a magnetic disk, an optical disk, a magneto-optical disk, and a magnetic tape. Specifically, a flexible disk, CD-ROM, an MO disk, and the like are included in the "computer-readable recording medium."

Next, an example of optimizing dummy metal arrangement will be explained. In the embodiment of the present invention, using a chip with a size of 22 mm×19 mm, a case will be explained in which defect occurrence at the time of applying a heat load from room temperature to 450° C. in one wiring layer which has a desired wiring structure is suppressed.

A dummy metal is arranged in the critical region extracted from the result of the stress analysis up to 450° C. about the finite element model shown in FIG. 4. In the dummy metal structure storage unit 24, a plurality of dot-shaped dummy metals with a size of 1 μm×1 μm where the coverages are changed are grouped as dummy metals with high priority. From among this groups, a 10%-coverage dummy metal is first arranged in the critical region.

The CAD data creation unit 16 creates CAD data which relates to the wiring structure after the arrangement of the 10%-coverage dummy metal. The composite property derivation unit 11 extracts wiring structure data after the arrangement of the 10%-coverage dummy metal from the CAD data after arranging this 10%-coverage dummy metal, and derives composite property using the rules of mixture on the basis of the extracted wiring structure data. The stress analysis unit 12 creates a three-dimensional model of the finite element method which uses each analysis area as an element, creates a finite element model of the whole chip where each composite property is applied to each element, and performs a stress analysis with increasing temperature from room temperature to 450° C. The critical region extraction unit 13 compares a result of the stress analysis by the stress analysis unit 12 with the fracture criterion, which is used for the breakdown due to thermal stress and extracted from the criteria storage unit 22, for all the analysis areas 101, and extracts analysis areas 101, where stress values are larger than the fracture criterion, as critical regions.

Figure 10:
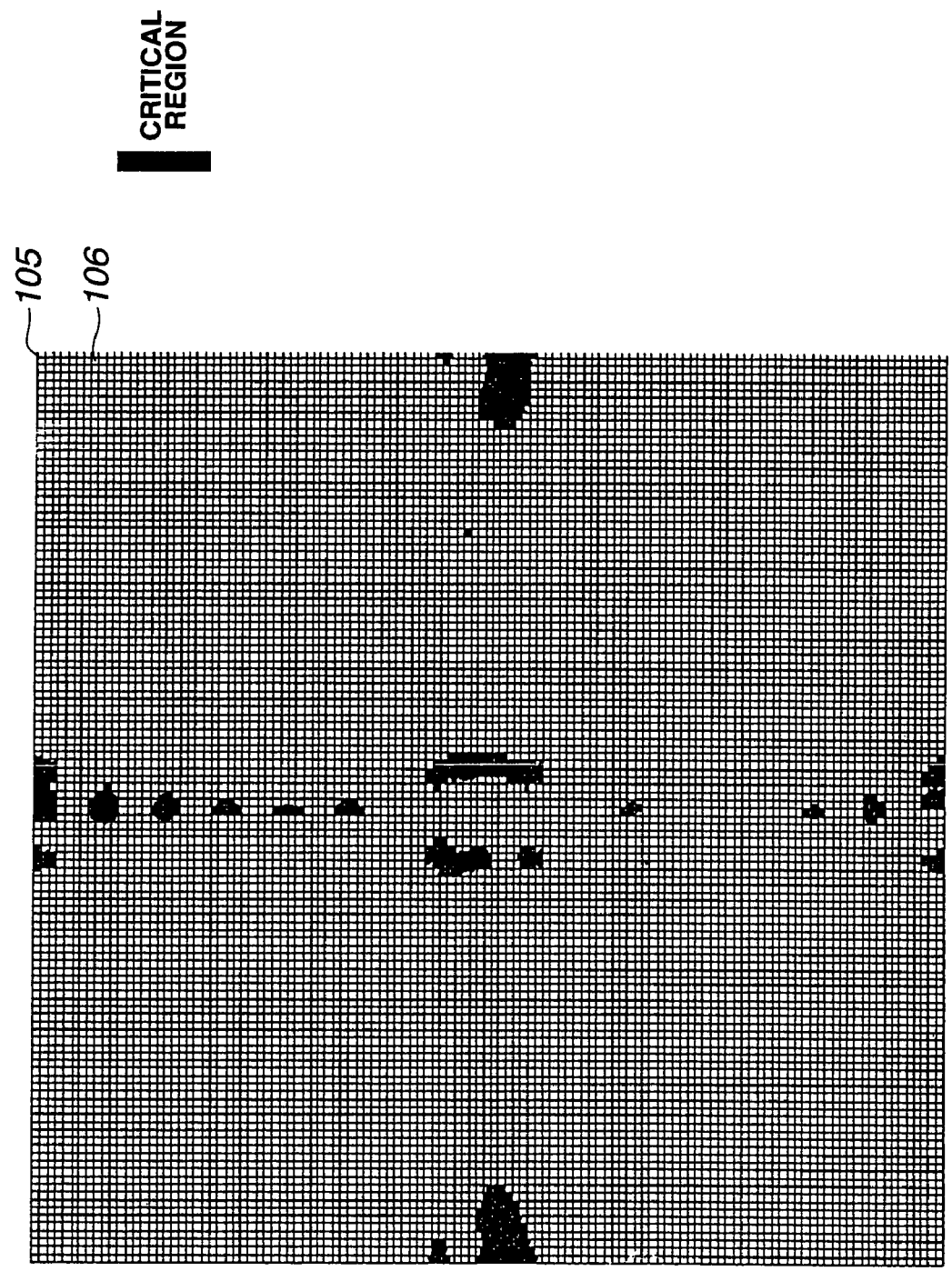
FIG. 10 is a schematic diagram showing an example of critical regions after arrangement of dummy metals with a 10% of coverage in the finite element model shown in FIG. 6 according to the embodiment of the present invention.

FIG. 10 shows critical regions extracted from an analysis result after arrangement of the 10%-coverage dummy metal in the finite element model 105 (FIG. 6) obtained as a result of performing a zooming analysis of the finite element model 103 shown in FIG. 4. It turns out that, although the number of regions decreases in comparison with the critical regions before dummy metal arrangement shown in FIG. 7, critical regions still exist.

The dummy metal arrangement unit 15 selects a 20%-coverage dummy metal from among the dot-shaped dummy metal group with a size of 1 µm×1 µm which is grouped in the dummy metal structure storage unit 24, and arranges it replacing the 10%-coverage dummy metal for it. The CAD data creation unit 16 creates CAD data which relates to the wiring structure after the arrangement of the 20%-coverage dummy metal. The composite property derivation unit 11 extracts wiring structure data in a wiring layer M1 after the arrangement of the 20%-coverage dummy metal from the CAD data after arranging this 20%-coverage dummy metal, and derives composite property using the rules of mixture on the basis of the extracted wiring structure data. The stress analysis unit 12 creates a three-dimensional model of the finite element method which uses each analysis area as an element, creates a finite element model of the whole chip where each composite property is applied to each element, and performs a stress analysis with increasing temperature from room temperature to 450° C. using the created finite element model. The critical region extraction unit 13 compares a result of the stress analysis by the stress analysis unit 12 with the fracture criterion, which is used for the breakdown due to thermal stress and extracted from the criteria storage unit 22, for all the analysis areas, and extracts analysis areas, where the stress values are larger than the fracture criterion, as critical regions. Consequently, when the 20%-coverage dummy metal is arranged, a critical region does not exist.

In order to verify this result, three chips of a chip which has the wiring structure expressed in the finite element model as shown in FIG. 4, a chip where the dot-shaped dummy metal with a size of 1 µm×1 µm is arranged at 10% of coverage in the critical regions in this wiring structure, and a chip where it is arranged at 20% of coverage were actually created, and an annealing experiment by an electric furnace was conducted. Annealing in a forming gas for 60 minutes was performed with changing temperature in a range of 150° C. to 450° C. Presence of an insulating film breakdown was observed using an optical microscope after the annealing. In consequence, although the insulating film breakdown was observed after annealing at 400° C. and 450° C. in the chip without dummy metal and the chip with the 10%-coverage dummy metal, an insulating film breakdown after annealing was not observed at all the temperature in the chip with the 20%-coverage dummy metal.

Figure 11:
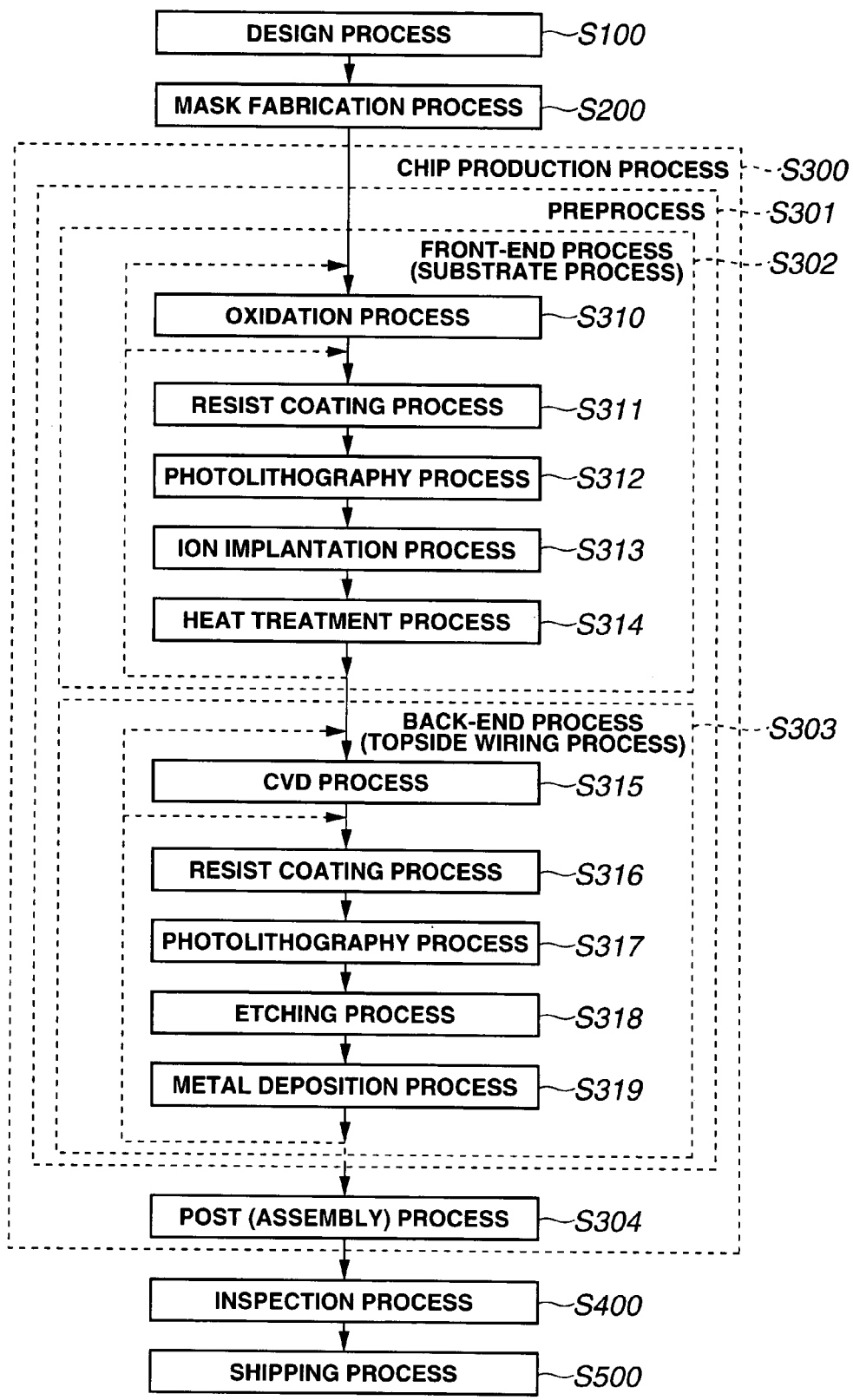
FIG. 11 is a flowchart for explaining an example of a semiconductor device production method according to the embodiment of the present invention.

Next, a semiconductor device production method according to an embodiment of the present invention will be explained with referring to a flowchart of FIG. 11. Note that, the semiconductor device production method described below is an example, and it is needless to say that it can be realized by various production methods other than this, including this modified example.

At step S100, a process simulation, a lithography simulation, a device simulation, and a circuit simulation are performed, and layout data (CAD data) is generated. Here, similarly to the procedure of the wiring structure design from steps S10 to S19 shown in FIG. 9, a stress analysis and dummy metal arrangement are performed, and optimum CAD data is created.

At step S200, mask data is generated for a design pattern of the CAD data generated at step S100. A mask pattern is formed in a mask substrate on the basis of the mask data, and photomasks are produced. In addition, a photomask is produced for each layer corresponding to each phase of the production process of an LSI, and a set of photomasks are prepared.

In a chip production process at step S300, a front-end process at step S301 and a back-end process at step S304 are performed. In the front-end process at step S301, a front-end process (substrate process) at step S302 and a back-end process (topside wiring process) at step S303 are performed. In the front-end process at step S302, for example, an oxidation process at step S310, a resist coating process at step S311, a photolithography process at step S312, a selective ion implantation process using a mask, formed at step S312, at step S313, a heat treatment process at step S314, and the like are performed. Selective etching using the mask formed at step S312 may be performed instead of steps S313 and S314. At step S302, various wafer processing processes, such as selective ion implantation and selective etching, are performed repeatedly. After a series of processes are completed, it advances to step S303.

At step S303, a back-end process in which wiring processing is performed on a substrate surface is performed. In the back-end process, various wafer processing processes such as a chemical vapor deposition (CVD) process at step S315, a resist coating process at step S316, a photolithography process at step S317, and a selective etching process using a mask, formed at step S317, at step S318, and a metal deposition process to a via hole and a damascene trench, which are formed at step S318, at step S319 are repeatedly performed. When a multilayer wiring structure is completed by a series of processes, it advances to step S304.

When the front-end process shown at step S301 is completed, the substrate is divided into predetermined chip size at step S304, a chip is mounted on a packaging material, and a package assembly process such as connection between electrode pads on the chip, and leads of a lead frame is performed. At step S400, a semiconductor device is completed through an inspection of the semiconductor device, and it is shipped at step S500.

According to the semiconductor device production method in accordance with the embodiment of the present invention, in a design process, it is possible to perform efficiently an analysis in consideration of stress resulting from a pattern arrangements design of the whole chip. Therefore, since the effective dummy metal arrangement can be achieved, it is possible to suppress a fatal defect arising in a pattern boundary section also in a heat process and processes, where an external force is applied, such as bonding and probing. Hence, it is possible to suppress the fatal malfunctions arising in a semiconductor device and its production processes. That is, it is possible to achieve higher performance and quality of semiconductor devices, and enhancement in reliability of semiconductor devices. In turn, it is possible to raise a yield of semiconductor devices and to increase productive efficiency of semiconductor devices.

FIRST MODIFIED EXAMPLE

In a first modified example of the embodiment of the present invention, fracture criteria measurement for a defect that a crack arises in an insulating film under a pad at the time of normal stress application to the pad in a probing process, a bonding process, etc. will be explained as another example of fracture criteria measurement. Although this defect is a defect that a crack arises in an $SiO_2$ film under a top layer pad in a semiconductor device which has a multi-layer structure using a low dielectric constant film as an inter-layer insulating film, it is not necessary to produce a sample with a multi-layer structure at the time of fracture criteria measurement. What is necessary is just to produce a sample which has at least one layer of wiring layer and an $SiO_2$ film for fracture criteria measurement as its upper layer. It is sufficient to produce an AL pad on an $SiO_2$ film, or it may be possible to perform the fracture criteria measurement without producing the AL pad depending on the case.

A probing experiment was performed with changing needle loads on the pad of the produced sample from 1 gram-load, 3 gram-load, 5 gram-load, and 7 gram-load sequentially. After probing, by etching the pad by wet processing, and observing the insulating film under the pad with an optical microscope, presence of a crack is observed. Consequently, cracks were observed at the time of the needle loads of 5 gram, and 7 gram.

On the other hand, the stress analysis unit 12 shown in FIG. 1 creates a finite element model of a structure similar to that of the sample for which the probing experiment was performed, and performs a stress analysis at the time of applying a normal load to the pad by probing using the created finite element model. Let a stress value which is obtained as a result of the stress analysis and which arises in the $SiO_2$ film in the case of 5 gram needle load be a fracture criterion of the insulating film breakdown at the time of the normal load application to the $SiO_2$ film.

In addition, it is also possible to use a nano indenter test for the fracture criteria measurement of the insulating film breakdown at the time of normal load application. In the nano indenter test, a pushing distance-vs.-load curve is measured for the produced sample with continuously increasing the load using a nano indenter. A pad may not be in the sample in this case, and a load is applied to an upper face of an $SiO_2$ film in that case. Since a point of inflexion appears in the pushing distance-vs.-load curve when a crack arises, the load at that time (breaking load) is recorded.

On the other hand, the stress analysis unit 12 creates a finite element model of a structure same as that of the sample for which the nano indenter measurement was performed, and performs a stress analysis which simulates the nano indenter test using the created finite element model. The stress analysis unit 12 determines a stress value in the $SiO_2$ film from a result of the stress analysis at the time of applying the breaking load obtained by the nano indenter test, and makes the value be a fracture criterion of the insulating film breakdown at the time of the normal load application to the $SiO_2$ film. In the nano indenter test, since an application load can be changed continuously, it is possible to measure a fracture criterion with higher precision than the probing test.

Furthermore, fracture criteria measurement for interface delamination at the time of CMP will be explained as another example of fracture criteria measurement. A sample which has at least one layer of wiring layer with a desired insulating film structure is produced. Although it is sufficient to perform the fracture criteria measurement by performing a CMP experiment in which a load at the time of CMP is changed, and observing presence of delamination, it is also sufficient to perform the fracture criteria measurement using a four-point bending test (4 Points-Bending; 4PB). In the 4PB test, since an application load can be changed continuously, it is possible to measure a fracture criterion with higher precision than the CMP experiment. In addition, when measuring a fracture criterion by the 4PB test, wiring may not be produced in a sample to be used, but a stacked-layer sample with only a desired insulating film is sufficient.

For example, in the case of a semiconductor device which uses an $SiO_2$ film for a via layer, a polymethylsiloxane film for a wiring layer, Cu for a wiring material, and Ta for a barrier metal, delamination at the time of CMP arises in an interface between the $SiO_2$ film and the polymethylsiloxane film. Then, a sample which has at least one layer of interface between an $SiO_2$ film and a polymethylsiloxane film on a Si substrate is produced, and the 4PB test is performed. It is possible to obtain a fracture criterion of the interface delamination between the $SiO_2$ film and the polymethylsiloxane film from a test result. In addition, the fracture criteria measurement may be performed using a DCB evaluation or a nano scratch test instead of the 4PB evaluation.

Furthermore, fracture criteria measurement for interface delamination from a chip edge at the time of packaging will be explained as another example of the fracture criteria measurement. Since the interface delamination at the time of CMP with a large contribution of a shearing load, and the delamination caused by thermal stress arising from difference between a coefficient of linear expansion of an encapsulation resin and that of the chip at the time of packaging have different fracture modes even if they are the same interface delamination, their fracture criteria are not the same. An m-ELT method of performing a delamination test using thermal stress arising from difference of a coefficient of linear expansion between an epoxy resin and that of the chip is suitable for the fracture criteria measurement of the interface delamination at the time of packaging. A sample which has at least one layer of interface between an $SiO_2$ film and a polymethylsiloxane film on a Si substrate is produced, and the m-ELT test is performed. It is possible to obtain a fracture criterion of interface delamination due to thermal stress between the $SiO_2$ film and the polymethylsiloxane film from a test result.

In addition, by using a similar method it is also possible to measure fracture criteria of other materials other than an insulating film material and a wiring material. In addition, the fracture criteria may be measured using other measuring methods than being mentioned above. The measured fracture criteria are collected and put in a database.

According to the first modified example of the embodiment of the present invention, it is possible to obtain the fracture criteria at the time of adding summation and loads under various conditions for a desired wiring structure by fracture criteria measurement using various methods.

SECOND MODIFIED EXAMPLE

As a second modified example of the embodiment of the present invention, optimization of dummy metals for defects related to multilayering will be explained. Even with a structure, where a defect is not observed in a single-layer structure, a defect may be observed in a via connecting portion etc. by multilayering it. In order to suppress defect occurrence at the time of adding a heat load from room temperature to 450° C., dummy metal arrangement is optimized.

Figure 12:
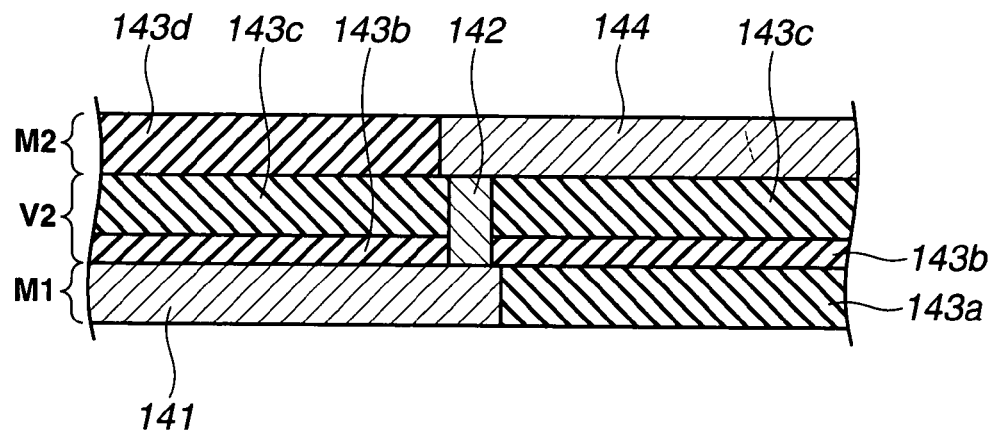
FIG. 12 is a sectional view of a structure for explaining another example of criteria measurement according to a second modified example of the embodiment of the present invention.

The second modified example of the embodiment of the present invention, as shown in FIG. 12, is intended for a chip with a multi-layer structure which has wiring layers M1 and M2, and a via layer V2 connecting the wiring layers M1 and M2, and has a desired wiring structure. Thus, an inter-layer insulating film 143a in which the wiring layer M1 is embedded and is formed, an etching stop film 143b, an inter-layer insulating film 143c in which the via layer V2 is embedded and is formed, and an inter-layer insulating film 143d where the wiring layer M2 is embedded and formed are sequentially stacked. Wiring 141 of the wiring layer M1 and wiring 144 of the wiring layer M2 are connected by a via 142. A plane size of the chip is 22 mm×19 mm.

The division unit 10 shown in FIG. 1 divides the chip with a size of 22 mm×19 mm into analysis areas in 200 μm×200 μm every layer of M1, V2, and M2. The composite property derivation unit 11 extracts wiring structure data on the wiring layer M1, via layer V2, and wiring layer M2 from the CAD data relating to a wiring structure in the chip, and derives composite property every analysis area 101 using the rules of mixture on the basis of the extracted wiring structure data. The stress analysis unit 12 creates a three-dimensional model of a finite element method, applies each composite property to each corresponding element, and completes a finite element model of the whole chip where models of the wiring layer M1, the via layer V2, and the wiring layer M2 are sequentially stacked on a model of the Si substrate not illustrated. About the obtained finite element model, a stress analysis is performed with increasing temperature from room temperature to 450° C.

The critical region extraction unit 13 extracts a fracture criterion for the breakdown due to thermal stress, from the criteria storage unit 22, compares results (stress values) of the stress analysis up to 450° C. with the extracted fracture criterion for the breakdown due to thermal stress, for all the analysis areas, and extracts analysis areas, where the stress values are larger than the fracture criterion, as critical regions. Here, a zooming analysis may be further performed about the extracted critical regions. In the second modified example of the embodiment of the present invention, by repeating zooming analyses, finally, refinement is performed up to a stress analysis with a finite element model in which the rules of mixture are not used, that is, which reproduces faithfully up to one via and one line of wiring. Consequently, the critical regions were found in the vicinity of a connecting portion of the via 142 and the wiring 141 and 144.

The judgment unit 14 judges presence of the critical regions extracted by the critical region extraction unit 13. The dummy metal arrangement unit 15 selects one dummy metal structure from a plurality of dummy metal structures stored in the dummy metal structure storage unit 24, and arranges the selected dummy metal structure in the critical regions which are extracted by the critical region extraction unit 13. Here, a structure constructed of dummy metals, where dot shapes with a size of 1 μm×1 μm are arranged in the wiring layers M1 and M2, as dummy metals with high priority, and at least one via connecting the dot shapes of the wiring layers M1 and M2 is grouped in the dummy metal structure storage unit 24. From among the groups, a dummy metal is sequentially arranged in the critical regions. Optimization of dummy metals was performed by repeating a series of analyses at steps S10 to S19 until the critical regions disappeared. Consequently, a dot-shaped dummy metal which has 40% of coverage and a size of 1 μm×1 μm without a via was selected.

In order to verify this result, a chip before dummy metal arrangement and a chip in which the dummy metals which were optimized in the critical regions were arranged were actually produced respectively about the wiring structure which was analyzed in the embodiment of the present invention, and an annealing experiment by an electric furnace was performed. Annealing in a forming gas for 60 minutes was performed with changing temperature in a range of 150° C. to 450° C. Presence of an insulating film breakdown was observed using an optical microscope after the annealing. In consequence, although the insulating film breakdown at the via portion was observed after annealing at 400° C. and 450° C. in the chip without dummy metal, a defect after annealing was not observed at all the temperature in the chip in which the dummy metals which were optimized in the critical regions were arranged.

As explained above, according to the second modified example of the embodiment of the present invention, it becomes possible to perform efficiently the optimization of dummy metal arrangement effective for suppressing an insulating film breakdown defect of multilayer wiring structure due to a heat load. Consequently, it is possible to obtain a semiconductor device with high quality, performance, and reliability as well as high productivity.

THIRD MODIFIED EXAMPLE

As a third modified example of the embodiment of the present invention, an optimization method of dummy metals to defects in the case of applying an external load will be explained. In order to suppress an insulating film breakdown arising under a pad when an external load is applied to the pad at the time of probing, dummy metal arrangement is optimized.

Figure 13:
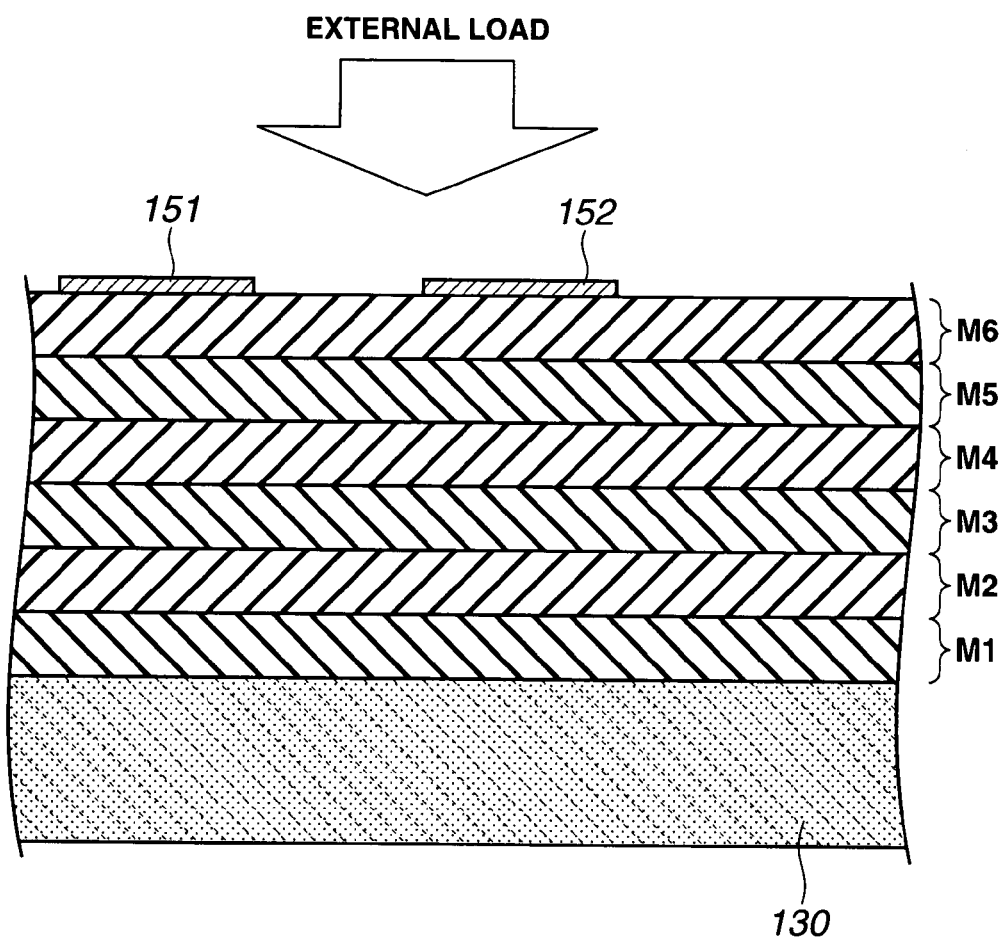
FIG. 13 is a sectional view of a structure for explaining still another example of criteria measurement according to a third modified example of the embodiment of the present invention.

As shown in FIG. 13, the third modified example of the embodiment of the present invention is intended for a chip which has desired wiring structures of wiring layers M1 to M6 respectively, and which further has an AL pad layer which includes AL pads 151 and 152 as an upper layer of the wiring layer M6. A plane size of the chip is 22 mm×19 mm.

The division unit 10 shown in FIG. 1 divides the 22 mm×19 mm chip into 200 μm×200 μm square regions (analysis areas) per each of the wiring layers M1 to M6 and per the AL pad layer. The composite property derivation unit 11 extracts wiring structure data on the wiring layers M1 to M6 and the AL pad layer from the CAD data relating to the wiring structures in the chip, and derives composite property every analysis area using the rules of mixture on the basis of the extracted wiring structure data.

The stress analysis unit 12 creates a three-dimensional model of a finite element method, applies each composite property to each corresponding element, and completes a finite element model of the whole chip where models of the wiring layers M1 to M6 and the Al pad layer are sequentially stacked on a model of the Si substrate not illustrated. Furthermore, supposing the needle load at the time of probing, the stress analysis unit 12 applies 1 to 7 gram of external loads to an area with a pad to which the loads are applied, in the finite element model, and performs a stress analysis. At the time of actual probing, the load application is performed by a probe which has several tens μm of diameter to a pad surface with a size of about 100 μm×100 μm. Since the pad size is smaller than the size of the analysis area 101, the loads are equally applied to an element surface on which the loads are applied, for example.

The critical region extraction unit 13 compares results (stress values) of the stress analysis by the stress analysis unit 12 with the fracture criterion, which is used for the breakdown due to normal stress and extracted from the criteria storage unit 22, for all the analysis areas 101, and extracts analysis areas, where the stress values are larger than the fracture criterion, as critical regions. For example, critical regions are observed directly under areas which have the AL pads 151 and 152. Here, zooming analyses are further performed about the extracted critical regions. Zooming is repeated in an analysis area size of 50 μm×50 μm, and further in an analysis area size of 10 μm×10 μm. In the analysis area size of 10

μm×10 μm, since the analysis area becomes smaller enough than the sizes of the AL pads 151 and 152, instead of applying the uniform loads to the element surface, it is possible to apply local loads which simulate the case of probing.

In the third modified example of the embodiment of the present invention, the stress analysis was performed with a cylinder type probe with 30 μm of diameter by applying the loads to a pad center section, in the zooming analysis in the analysis area size of 10 μm×10 μm. By repeating the zooming analyses, finally, refinement of a model may be performed up to a stress analysis with a finite element model in which the rules of mixture are not used, that is, which reproduces faithfully up to one via and one line of wiring. Critical regions are observed in insulating film sections directly under the pads as a result of the analysis.

The dummy metal arrangement unit 15 arranges dummy metals in the critical regions extracted by the critical region extraction unit 13. Dummy metals with high priority are grouped in the dummy metal structure storage unit 24. In the third modified example of the embodiment of the present invention, the following structures are grouped: a structure in which dot-shaped wiring 161 shown in FIG. 14A and dot-shaped wiring 162 and 163 shown in FIG. 14B are connected with at least one pillar-shaped via 164, a structure in which dot-shaped wiring 165 and 166 shown in FIG. 14C is connected with at least one via layer trench 167, an L/S-structure by parallel wiring 167 shown in FIG. 14D, a structure in which intersections of the top and bottom wiring 168 and 169 in the L/S-structure shown in FIG. 14E are connected with at least one pillar-shaped via 170, a structure of braided wiring 171 shown in FIG. 14F, a structure in which top and bottom wiring 172 and 173 in the braided wiring shown in FIG. 14G is connected with at least one pillar-shaped via 174, and a structure in which top and bottom wiring 175 and 176 in the braided wiring shown in FIG. 14H is connected with at least one via layer trench 177. From among the groups, dummy metals were arranged in the critical regions in order, and optimization of dummy metals was performed by repeating a series of analyses until the critical regions disappeared. Although a plurality of dummy metals with which the critical regions disappeared existed as a result of the analysis, also in consideration of the convenience of design and processes, a dot-shaped dummy metal which has 40% of coverage and a size of 1 μm×1 μm without via was selected.

A chip before dummy metal arrangement and a chip in which the dummy metal which was optimized in the critical regions was arranged were actually produced respectively about the wiring structures which were analyzed in the third modified example of the embodiment of the present invention, and a probing experiment was performed. Presence of an insulating film breakdown was observed using an optical microscope after the probing. Consequently, in the chip without dummy metal, the insulating film breakdown was observed under the AL pads after the probing. On the other hand, a defect was not observed in the chip in which the optimized dummy metals were arranged in the critical regions.

As explained above, according to the third modified example of the embodiment of the present invention, it becomes possible to perform efficiently the optimization of dummy metal arrangement effective for suppressing an insulating film breakdown defect of the multilayer wiring structure due to a normal load. Consequently, it is possible to obtain a semiconductor device with high quality, performance, and reliability as well as high productivity.

FOURTH MODIFIED EXAMPLE

As a fourth modified example of the embodiment of the present invention, a method of optimizing dummy metals for a multilayer wiring structure which passes through a plurality of processes will be explained so as to have sufficient resistance also to loads in any process. In order to suppress occurrence of all kinds of defects such as an insulating film breakdown by a heat load in a heat process and a short-circuit defect accompanying it, an insulating film breakdown under a pad by a normal load in a probing or bonding process, interfacial peeling in a packaging process, and film delamination at the time of shearing load application in a CMP process, dummy metal arrangement is optimized.

As shown in FIG. 13, the fourth modified example of the embodiment of the present invention is intended for a chip which has desired wiring structures of wiring layers M1 to M6 respectively, and which has an AL pad layer which includes AL pads 151 and 152 as an upper layer of the wiring layer M6. A plane size of the chip is 22 mm×19 mm.

Figure 15:
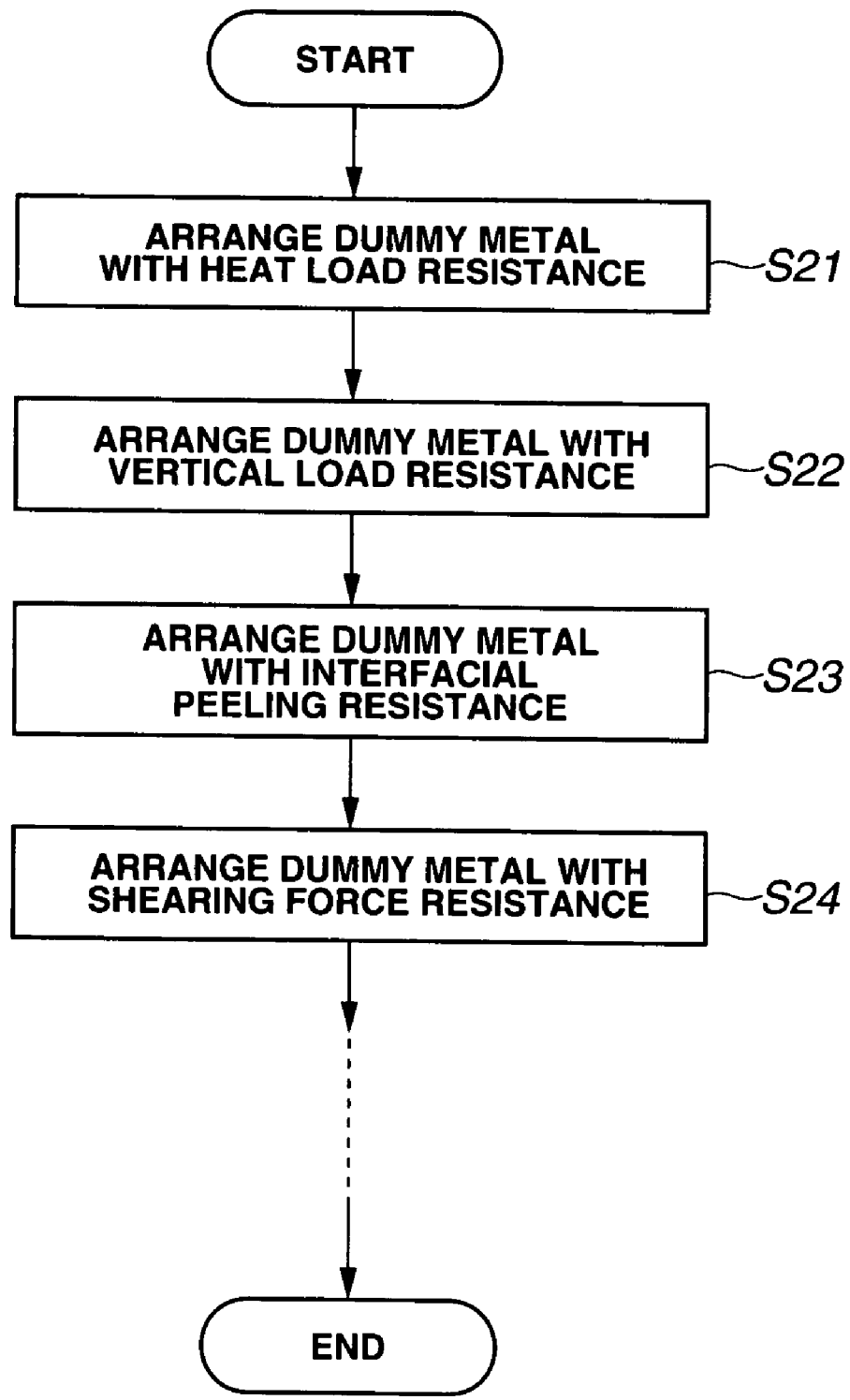
FIG. 15 is a flowchart (algorithm) for explaining an example of an wiring structure design method according to a fourth modified example of the embodiment of the present invention.

The division unit 10 divides the 22 mm×19 mm chip into 200 μm×200 μm analysis areas per each of the wiring layers M1 to M6 and per the AL pad layer at step S21 shown in FIG. 15. The composite property derivation unit 11 extracts wiring structure data on the wiring layers M1 to M6 and the AL pad layer from the CAD data relating to the wiring structures in the chip, and derives composite property every analysis area using the rules of mixture on the basis of the extracted wiring structure data. The stress analysis unit 12 creates a three-dimensional model of a finite element method, applies each composite property to each corresponding element, and completes a finite element model of the whole chip where models of the wiring layers M1 to M6 and the Al pad layer are sequentially stacked on a model of the Si substrate not illustrated. About the obtained finite element model, dummy metal optimization aiming at defect suppression in a sintering process is performed first. The stress analysis unit 12 simulates the sinter process, performs a stress analysis with increasing and decreasing temperature from room temperature to 400° C. The critical region extraction unit 13 compares a result of the stress analysis by the stress analysis unit 12 with the fracture criterion, which is used for the breakdown due to thermal stress and extracted from the criteria storage unit 22, for all the analysis areas, and extracts analysis areas, where the stress values are larger than the fracture criterion, as critical regions. Here, a zooming analysis may be further performed about the extracted critical regions.

Figure 16:
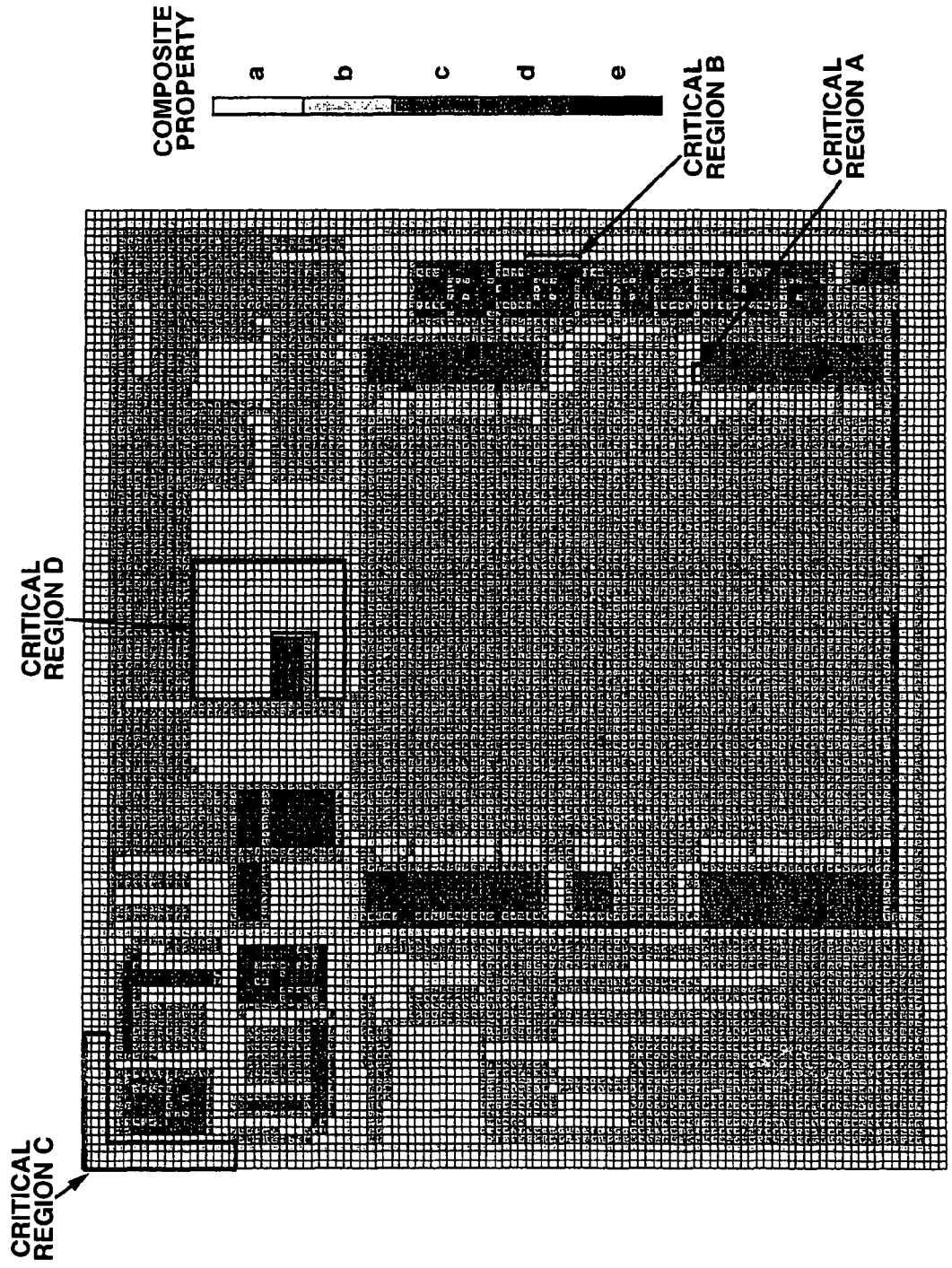
FIG. 16 is a schematic diagram showing an example of critical regions according to the fourth modified example of the embodiment of the present invention.

A part of the critical regions in the sintering process which are extracted about the wiring layer M1 among the structures which were analyzed in the fourth modified example of the embodiment of the present invention is shown in FIG. 16 as a critical region A. The critical region A exists in a portion, where a wiring coverage difference is particularly large, in the boundary section between regions whose wiring coverage values are different. The dummy metal arrangement unit 15 arranges dummy metals in the critical regions extracted by the critical region extraction unit 13. Optimization of dummy metals was performed by repeating a series of analyses at steps S10 to S19, shown in FIG. 9, until the critical regions disappeared. For example, a dot-shaped dummy metal which has 40% of coverage and a size of 0.3 μm×0.3 μm is selected. The CAD data creation unit 16 creates CAD data which relates to the wiring structure in which the optimized dummy metal is arranged in the critical region A.

At step S22, dummy metal optimization aiming at defect suppression in a probing process is performed about the CAD data after the dummy metal arrangement in the critical region A. The stress analysis unit 12 creates a finite element model after the dummy metal arrangement in the critical region A on the basis of the CAD data after the dummy metal arrangement in the critical region A. The stress analysis section 12 performs a stress analysis which simulates the probing process. The critical region extraction unit 13 compares a result of the stress analysis by the stress analysis unit 12 with the fracture criterion, which is used at the time of normal stress application and extracted from the criteria storage unit 22, for all the analysis areas. Analysis areas, where the stress values are larger than the fracture criterion, are extracted as critical regions. Here, a zooming analysis may be further performed about the extracted critical regions.

A part of the critical regions in the probing process extracted in the embodiment of the present invention is shown in FIG. 16 as a critical region B. The critical region B exists in insulating film sections directly under the AL pads 151 and 152. The dummy metal arrangement unit 15 arranges dummy metals in the extracted critical regions. Optimization of dummy metals was performed by repeating a series of analyses at steps S10 to S19, shown in FIG. 9, until the critical regions disappeared. For example, a dot-shaped dummy metal which has 40% of coverage and a size of 1.0 μm×1.0 μm is selected. The CAD data creation unit 16 creates CAD data which relates to the wiring structure in which the optimized dummy metals are arranged in the critical regions A and B respectively.

At step S23, dummy metal optimization aiming at suppressing an insulating film interface delamination defect at the time of TCT test after a packaging process is performed about the CAD data after the dummy metal arrangement in the critical regions A and B. The stress analysis unit 12 creates a finite element model of the chip after the dummy metal arrangement in the critical regions A and B on the basis of the CAD data after the dummy metal arrangement in the critical regions A and B. The stress analysis unit 12 creates a finite element model by means of creating a model of the whole chip which simulates the TCT test after packaging and coating the model with a resin, and performs a stress analysis when applying a heat cycle of −55° C. to 125° C. The critical region extraction unit 13 compares a result of the stress analysis by the stress analysis unit 12 with the fracture criterion, which is used for interface delamination at the time of applying the heat cycle and extracted from the criteria storage unit 22, for all the analysis areas. Analysis areas, where the stress values are larger than the fracture criterion, are extracted as critical regions. Here, a zooming analysis may be further performed about the extracted critical regions.

A part of the critical regions at the time of TCT test after the packaging process which is extracted in the embodiment of the present invention is shown in FIG. 16 as a critical region C. The critical region C exists in a chip edge. A dummy metal is arranged in the extracted critical region C. Optimization of dummy metals was performed by repeating a series of analyses at steps S10 to S19, shown in FIG. 9, until the critical regions disappeared. For example, a braided-wiring-shaped dummy metal which has 25% of coverage, and a via layer trench with a wiring size of 1.0 μm is selected. CAD data is created which relates to the wiring structure in which the optimized dummy metals are arranged in the critical regions A, B, and C respectively.

At step S24, dummy metal optimization aiming at suppressing an insulating film interface delamination defect in a CMP process is performed about the CAD data after the dummy metal arrangement in the critical regions A, B, and C. The stress analysis unit 12 creates a finite element model of the chip after the dummy metal arrangement in the critical regions A, B, and C on the basis of the CAD data after the dummy metal arrangement in the critical regions A, B, and C. The stress analysis unit 12 performs a stress analysis at the time of applying a load which simulates the CMP process. The critical region extraction unit 13 compares a result of the stress analysis by the stress analysis unit 12 with a fracture criterion, which is used for interface delamination at the time of applying a shearing load and extracted from the criteria storage unit 22, for all the analysis areas. Analysis areas, where the stress values are larger than the fracture criterion, are extracted as critical regions. Here, a zooming analysis may be further performed about the extracted critical regions.

A part of the critical regions in the CMP process is shown in FIG. 16 as a critical region D. The critical region D exists in a portion in which a region where a coverage value is 20% or less, that is, low has a comparatively large area. A dummy metal is arranged to the extracted critical region D. Optimization of dummy metals is performed by repeating a series of analyses at steps S10 to S19, shown in FIG. 9, until the critical regions disappear. For example, a dot-shaped dummy metal which has 25% of coverage and a size of 1.0 μm×1.0 μm is selected. The optimized dummy metals are arranged respectively in the critical regions A, B, C, and D, and the optimization of the dummy metals is ended.

In order to verify this result, samples where the optimized dummy metals were arranged were actually produced. A defect did not arise in any of processes such as a CMP process, all the heat processes at the time of sample production, such as annealing and sintering, a probing process to the AL pads 151 and 152 after sample production, and a TCT test after a packaging process, in the respective wiring layers M1 to M6.

As explained above, according to the fourth modified example of the embodiment of the present invention, it becomes possible to optimize efficiently a dummy metal which has sufficient resistance to a load in any of processes in a multilayer wiring structure, which passes through a plurality of processes, by sequentially performing stress analyses to mutually different loads in various processes, and optimizing dummy metals. Consequently, it is possible to obtain a semiconductor device with high quality, performance, and reliability as well as high productivity.

In addition, in the fourth modified example of the embodiment of the present invention, as shown in FIG. 15, the dummy metal arrangement was optimized in order of the heat process, probing process, packaging process, and CMP process. This is performed in order of processes where areas of critical regions extracted are estimated to be small. By performing analyses in order of processes where areas of critical regions are small, it becomes possible not only to shorten the analysis time, but also dummy metals after optimization are further simplified, and it becomes possible to obtain dummy metals with low loads to a design and processes. In this way, when performing the analyses continuously about a plurality of processes, it is possible to obtain dummy metals more efficiently in a short time and in high reliability by specifying the order of the analyses.

Other Embodiments

In this way, although the present invention was described by the embodiments, it should not be understood that statements and drawings which are a part of this disclosure limit this invention. Various alternative embodiments, examples, and operation techniques will become obvious for those skilled in the art from this disclosure. It is needless to say that the present invention includes various embodiments which are not described here. Hence, the technical scope of the present invention is defined only by specific matters of the invention according to reasonable scope of claims from the above description.

What is claimed is:

1. A stress analysis method, comprising:
   dividing, on a computer, by using a division unit, an inside of a chip into a plurality of analysis areas;
   deriving, by using a composite property derivation unit, a composite property into which physical property values of a plurality of materials included in an analysis area are compounded, about each of the plurality of analysis areas on the basis of wiring structure data for each of the plurality of analysis areas, the composite property being derived by compositing a physical property value of a first material of the plurality of materials and a physical property value of a second material of the plurality of materials at a ratio on the basis of a wiring coverage; and
   creating, by using a stress analysis unit, a three-dimensional model of a finite element method which uses each analysis area as an element, to apply the composite property to each element, and to perform a stress analysis.

2. The stress analysis method according to claim 1, wherein the composite property derivation unit uses at least one of a wiring coverage, a wiring width, and a wiring length as the wiring structure data.

3. The stress analysis method according to claim 2, wherein the composite property derivation unit uses round numbers as the wiring coverage.

4. The stress analysis method according to claim 1, wherein the composite property derivation unit derives at least one of a composite Young's modulus, a composite coefficient of linear expansion, and a Poisson's ratio as the composite property.

5. The stress analysis method according to claim 1, wherein the stress analysis unit applies a predetermined load to each element of the three-dimensional model, and performs the stress analysis.

6. The stress analysis method according to claim 5, wherein the stress analysis unit uses at least one of a heat load, a normal load, and a shearing load as the predetermined load.

7. The stress analysis method according to claim 1, wherein the deriving of the composite property comprises deriving the composite property by compositing a physical property value of a wiring material as the first material of the plurality of materials and a physical property value of an inter-layer insulating film material as the second material of the plurality of materials at a ratio on the basis of the wiring coverage of the wiring material.

8. The stress analysis method according to claim 7, wherein the deriving of the composite property comprises, in a case where the wiring material or the inter-layer insulating film material includes two or more materials, deriving the composite property based on a volume ratio of the two or more materials.

9. A non-transitory computer-readable recording medium storing a program which causes a computer to execute instructions for:
   a division unit to divide an inside of a chip into a plurality of analysis areas;
   a composite property derivation unit to derive a composite property into which physical property values of a plurality of materials included in an analysis area are compounded, about each of a plurality of analysis areas on the basis of wiring structure data for each of the plurality of analysis areas, the composite property being derived by compositing a physical property value of a first material of the plurality of materials and a physical property value of a second material of the plurality of materials at a ratio based on a wiring coverage; and
   a stress analysis unit to create a three-dimensional model of a finite element method which uses each analysis area as an element, to apply the composite property to each element, and to perform a stress analysis.

10. The non-transitory computer-readable recording medium according to claim 9, wherein the composite property derivation unit derives at least one of a composite Young's modulus, a composite coefficient of linear expansion, and a Poisson's ratio as the composite property.

11. The non-transitory computer-readable recording medium according to claim 9, wherein the stress analysis unit applies a predetermined load to each element of the three-dimensional model, and performs the stress analysis.

12. The non-transitory computer-readable recording medium according to claim 11, wherein the stress analysis unit uses at least one of a heat load, a normal load, and a shearing load as the predetermined load.

13. A stress analysis method, comprising:
   dividing, on a computer, by using a division unit, an inside of a chip into a plurality of analysis areas;
   deriving, by using a composite property derivation unit, a composite property into which physical property values of a plurality of materials included in an analysis area are compounded, about each of the plurality of analysis areas on the basis of wiring structure data for each of the plurality of analysis areas;
   extracting, by using a critical region extraction unit, a critical region from the plurality of analysis areas on the basis of stress values obtained as a result of the stress analysis; and
   further dividing a region extracted as the critical region in extracting a critical region into new analysis areas, and again performing the deriving of a composite property and the stress analysis.

14. The stress analysis method according to claim 13, further comprising:
   further dividing a region extracted as the critical region in extracting a critical region into new analysis areas, and performing stress analysis using physical property values of materials included in the new analysis areas based on a wiring structure data of the new analysis areas.

15. A non-transitory computer-readable recording medium storing a program which causes a computer to execute instructions for:
   a division unit to divide an inside of a chip into a plurality of analysis areas;
   a composite property derivation unit to derive a composite property into which physical property values of a plurality of materials included in an analysis area are compounded, about each of a plurality of analysis areas on the basis of wiring structure data for each of the plurality of analysis areas;
   a stress analysis unit to create a three-dimensional model of a finite element method which uses each analysis area as an element, to apply the composite property to each element, and to perform a stress analysis;
   a critical region extraction unit to extract a critical region from the plurality of analysis areas on the basis of stress values obtained as a result of the stress analysis; and
   further dividing a region extracted as the critical region by the instruction for extracting a critical region into new analysis areas, and again performing the instructions for deriving a composite property and performing a stress analysis.

16. The non-transitory computer-readable recording medium according to claim 15, wherein the program further comprises an instruction for:
   further dividing a region extracted as the critical region by the instruction for extracting a critical region into new analysis areas, and performing stress analysis using physical property values of materials included in the new analysis areas based on a wiring structure data of the new analysis areas.

* * * * *